United States Patent
Kim et al.

(10) Patent No.: US 10,139,546 B2
(45) Date of Patent: Nov. 27, 2018

(54) DISPLAY DEVICE

(71) Applicant: LG ELECTRONICS INC., Seoul (KR)

(72) Inventors: Geunhwan Kim, Seoul (KR); Sujin Sim, Seoul (KR); Woosuk Lee, Seoul (KR); Juyoung Joung, Seoul (KR); Minho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/408,327

(22) Filed: Jan. 17, 2017

(65) Prior Publication Data

US 2017/0212293 A1 Jul. 27, 2017

(30) Foreign Application Priority Data

Jan. 22, 2016 (KR) .................. 10-2016-0008348
Jan. 28, 2016 (KR) .................. 10-2016-0010651

(51) Int. Cl.
*F21V 8/00* (2006.01)

(52) U.S. Cl.
CPC ......... *G02B 6/0043* (2013.01); *G02B 6/0038* (2013.01); *G02B 6/0061* (2013.01); *G02B 6/0065* (2013.01)

(58) Field of Classification Search
CPC .. G02B 6/0043; G02B 6/0038; G02B 6/0011; G02B 6/0026; G02B 6/0033; G02B 6/0055; G02B 6/0016; G02B 6/0025; G02B 6/0031; G02B 6/0068; G02B 6/0073; G02B 6/0088; G02B 6/009; F21V 2200/20
See application file for complete search history.

(56) References Cited

U.S. PATENT DOCUMENTS

| | | | |
|---|---|---|---|
| 2006/0255711 A1* | 11/2006 | Dejima | G02B 6/0023 313/485 |
| 2009/0080215 A1* | 3/2009 | Anandan | G02B 6/0036 362/606 |
| 2010/0283914 A1* | 11/2010 | Hamada | G02B 6/0026 348/731 |
| 2014/0071709 A1 | 3/2014 | Ren et al. | |
| 2014/0146563 A1 | 5/2014 | Watanabe et al. | |
| 2015/0009783 A1* | 1/2015 | Hanzawa | G04B 19/30 368/67 |

(Continued)

FOREIGN PATENT DOCUMENTS

| | | |
|---|---|---|
| KR | 1020070113577 | 11/2007 |
| KR | 1020150123086 | 11/2015 |

OTHER PUBLICATIONS

PCT International Application No. PCT/KR2016/015219, International Search Report dated Apr. 6, 2017, 3 pages.

*Primary Examiner* — Hargobind S Sawhney
(74) *Attorney, Agent, or Firm* — Lee, Hong, Degerman, Kang & Waimey PC

(57) ABSTRACT

A display device is disclosed. The display device includes a display panel, a light guide plate located in a rear of the display panel, a light assembly located on a side of the light guide plate and providing the light guide plate with light, and a light absorbing portion formed on a back surface or a front surface of the light guide plate and absorbing the light provided by the light assembly in a predetermined wavelength range.

15 Claims, 30 Drawing Sheets

(56) References Cited

U.S. PATENT DOCUMENTS

2015/0029435 A1* 1/2015 You .................... G02B 6/0036
349/58
2015/0085522 A1 3/2015 Im et al.
2016/0190409 A1* 6/2016 Kuo .................... H01L 33/507
257/98

* cited by examiner

FIG. 7
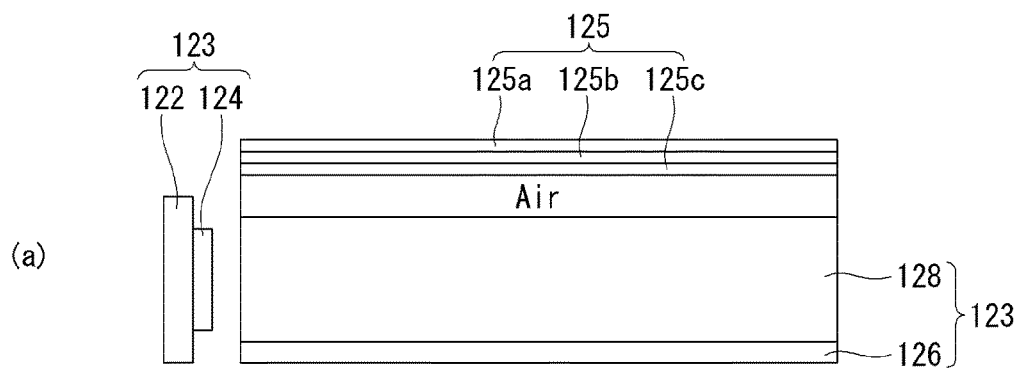
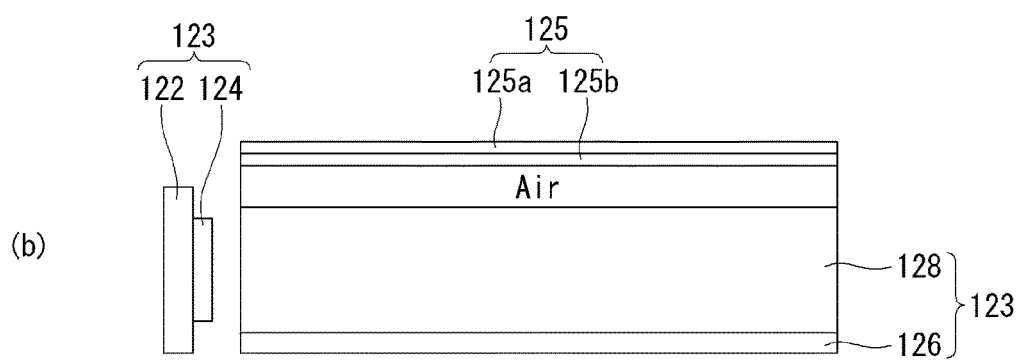

FIG. 29
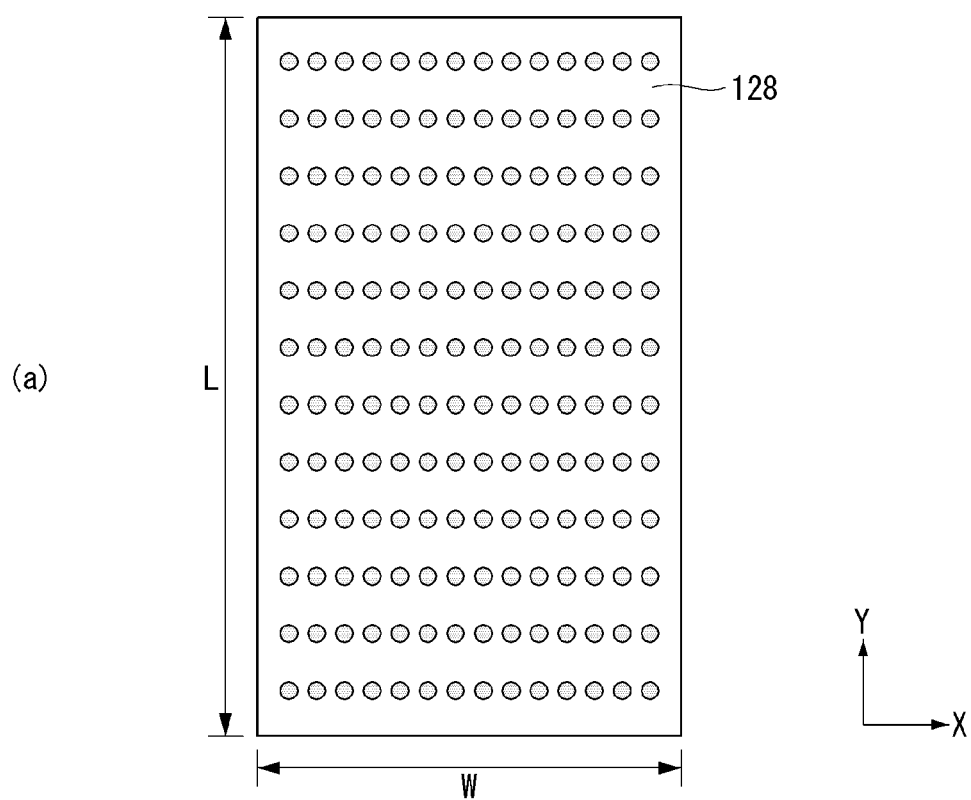
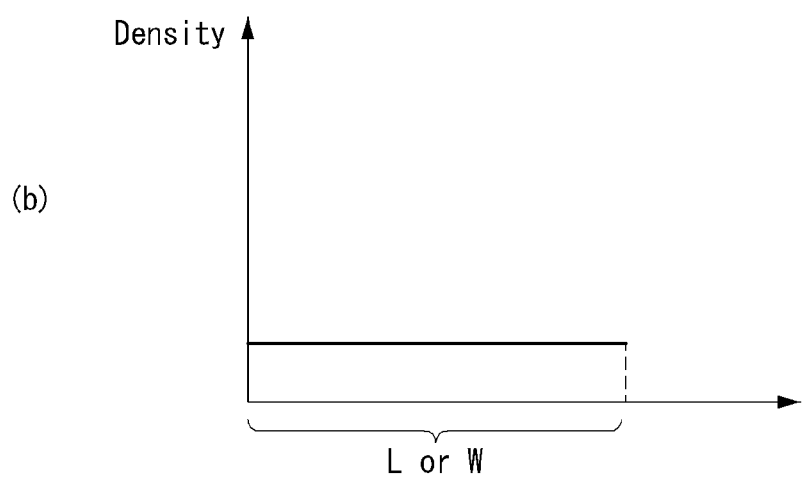

FIG. 30
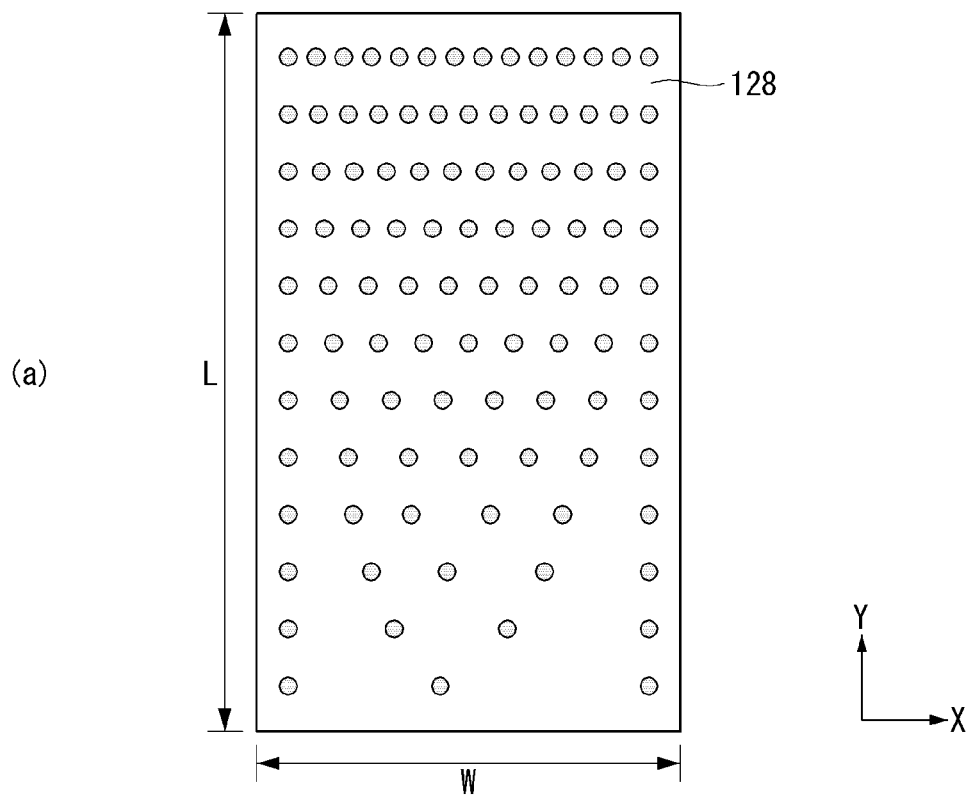
(a)
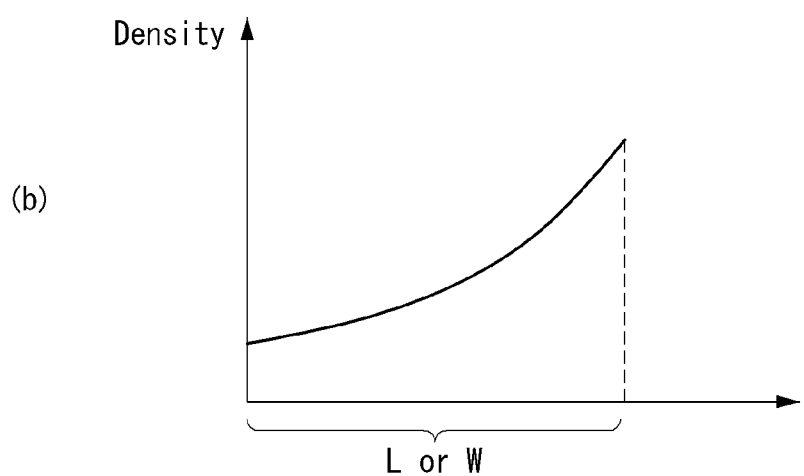
(b)

DISPLAY DEVICE

CROSS-REFERENCE TO RELATED APPLICATIONS

Pursuant to 35 U.S.C. § 119(a), this application claims the benefit of earlier filing date and right of priority to Korean Patent Application Nos. 10-2016-0008348, filed on Jan. 22, 2016 and 10-2016-0010651, filed on Jan. 28, 2016, the contents of which are all hereby incorporated by reference herein in their entirety.

BACKGROUND OF THE INVENTION

Field of the Invention

The present disclosure relates to a display device.

Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

Accordingly, an object of the present disclosure is to address the above-described and other problems.

Another aspect of the present disclosure is to provide a display device capable of improving image quality.

Another aspect of the present disclosure is to provide a display device capable of improving color reproduction.

Another aspect of the present disclosure is to provide a display device capable of efficiently controlling a wavelength of light provided by a backlight unit.

In one aspect, there is provided a display device comprising a display panel, a light guide plate located in a rear of the display panel, a light assembly located on a side of the light guide plate and providing the light guide plate with light, and a light absorbing portion formed on a back surface of the light guide plate and absorbing the light provided by the light assembly in a predetermined wavelength range.

According to another aspect of the present disclosure, the display device may further comprise a reflective portion formed on the back surface of the light guide plate and reflecting the light provided by the light assembly on the display panel.

According to another aspect of the present disclosure, at least one of the light absorbing portion or the reflective portion may form a pattern. The pattern may be uniformly distributed or uniformly sized.

According to another aspect of the present disclosure, at least one of the light absorbing portion or the reflective portion may form a pattern. The pattern may be non-uniformly distributed or non-uniformly sized.

According to another aspect of the present disclosure, the light absorbing portion and the reflective portion may be formed as one body.

According to another aspect of the present disclosure, the light absorbing portion may be formed around the reflective portion.

According to another aspect of the present disclosure, the reflective portion may be a groove formed on the back surface of the light guide plate, and the light absorbing portion may be positioned on the groove.

According to another aspect of the present disclosure, the reflective portion may be a groove formed on the back surface of the light guide plate. The light absorbing portion may be positioned around the groove and formed on the back surface of the light guide plate.

According to another aspect of the present disclosure, the light absorbing portion may include tetraaza porphyrin derivatives.

According to another aspect of the present disclosure, the light absorbing portion may include sub-phthalocyanine pigment.

According to another aspect of the present disclosure, the portion of the light may have a wavelength range of 530 nm to 630 nm.

According to another aspect of the present disclosure, the predetermined wavelength range may be a wavelength range of 580 nm to 630 nm.

According to another aspect of the present disclosure, the predetermined wavelength range may be between a wavelength of green light and a wavelength of red light.

According to another aspect of the present disclosure, the light absorbing portion may be attached to the back surface of the light guide plate.

According to another aspect of the present disclosure, the light absorbing portion may include a reflective material.

According to another aspect of the present disclosure, the light absorbing portion may form a less dense pattern as the light absorbing portion is adjacent to the light assembly. The light absorbing portion may form a more dense pattern as the light absorbing portion is far away from the light assembly.

In another aspect, there is provided a display device comprising a display panel, a light guide plate located in a rear of the display panel, a light assembly located on one side of the light guide plate and providing light for the light guide plate, and a light absorbing portion formed on a front surface of the light guide plate and absorbing a portion having a predetermined wavelength range among the light provided by the light assembly.

According to another aspect of the present disclosure, the light absorbing portion may have a non-uniform thickness.

According to another aspect of the present disclosure, a thickness of the light absorbing portion may decrease as the light absorbing portion is adjacent to the light assembly. A thickness of the light absorbing portion may increase as the light absorbing portion is far away from the light assembly.

According to another aspect of the present disclosure, the thickness of the light absorbing portion may increase as the light absorbing portion is adjacent to an edge of the light guide plate.

According to another aspect of the present disclosure, the light absorbing portion may be attached to the front surface of the light guide plate.

According to another aspect of the present disclosure, the light guide plate may have the smooth front surface.

An effect of the display device according to the present disclosure is described below.

According to at least one aspect of the present disclosure, the present disclosure can provide the display device for improving image quality.

According to at least one aspect of the present disclosure, the present disclosure can provide the display device for improving color reproduction.

According to at least one aspect of the present disclosure, the present disclosure can provide the display device for efficiently controlling a wavelength of light provided by a backlight unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 3 to 9 illustrate configuration of a display device according to an example embodiment of the invention;

FIGS. 29 and 30 illustrate other examples of another pattern of a light guide plate according to an example embodiment of the invention;

DETAILED DESCRIPTION OF THE EMBODIMENTS

Figure 1:
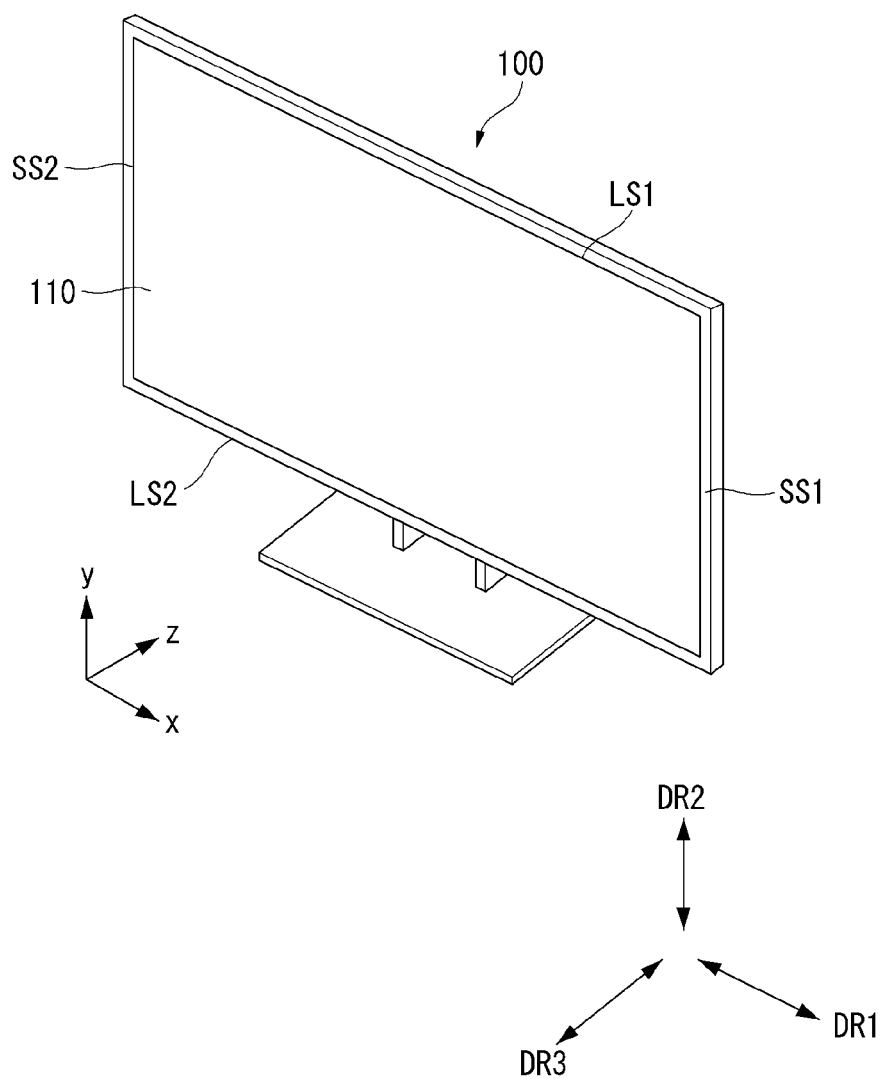
FIGS. 1 and 2 illustrate a display device according to an example embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display device 100 may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device 100, and a second direction DR2 may be a direction parallel to the short sides SS1 and SS2 of the display device 100.

Further, a third direction DR3 may be a direction vertical to the first direction DR1 and/or the second direction DR2.

In the embodiment disclosed herein, the first direction DR1 and the second direction DR2 may be commonly referred to as a horizontal direction.

Further, the third direction DR3 may be referred to as a vertical direction.

In another point of view, a side or a surface, on which the display device 100 displays an image, may be referred to as a front side or a front surface. When the display device 100 displays the image, a side or a surface, at which the image cannot be observed, may be referred to as a back side or a back surface. When the display device 100 is observed at the front side or the front surface, the first long side LS1 may be referred to as an upper side or an upper surface. In the same manner as the first long side LS1, the second long side LS2 may be referred to as a lower side or a lower surface. Further, the first short side SS1 may be referred to as a left side or a left surface, and the second short side SS2 may be referred to as a right side or a right surface.

Further, the first long side LS1, the second long side LS2, the first short side SS1, and the second short side SS2 may be referred to as edges of the display device 100. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In the embodiment disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Figure 2:
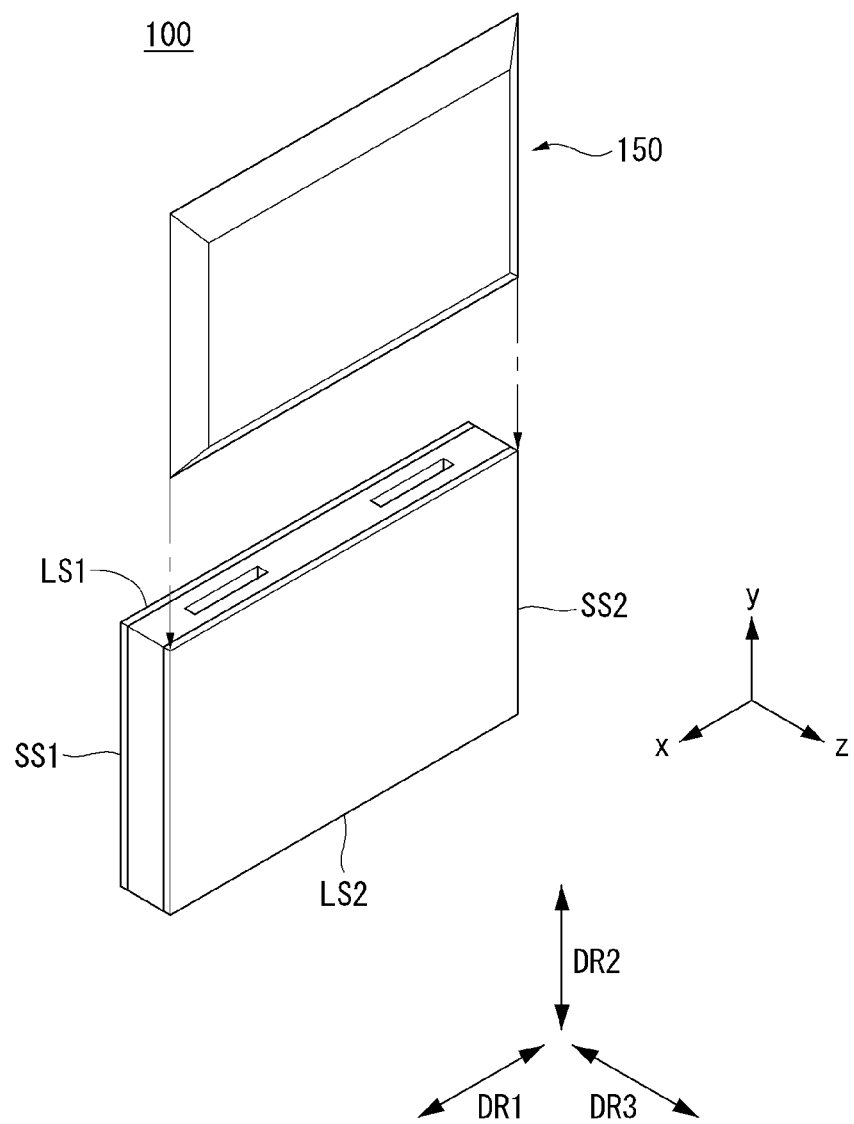

FIGS. 1 and 2 illustrate a display device according to an example embodiment of the invention.

As shown in FIGS. 1 and 2, a display device 100 according to an example embodiment of the invention may include a display panel 110 and a back cover 150 positioned in the rear of the display panel 110.

The back cover 150 may be coupled with the display panel 110 while sliding in a direction (i.e., the second direction DR2) from the first long side LS1 to the second long side LS2. In other words, the back cover 150 may be inserted into the display panel 110 while sliding from a first short side SS1, a second short side SS2 opposite the first short side SS1, and a first long side LS1 which is adjacent to the first and second short sides SS1 and SS2 and is positioned between the first short side SS1 and the second short side SS2, of the display panel 110.

The back cover 150 and/or other components adjacent to the back cover 150 may include a protrusion, a sliding portion, a connection portion, etc., so that the back cover 150 is coupled with the display panel 110 in the sliding manner.

FIGS. 3 to 9 illustrate configuration of a display device according to an example embodiment of the invention.

Figure 3:
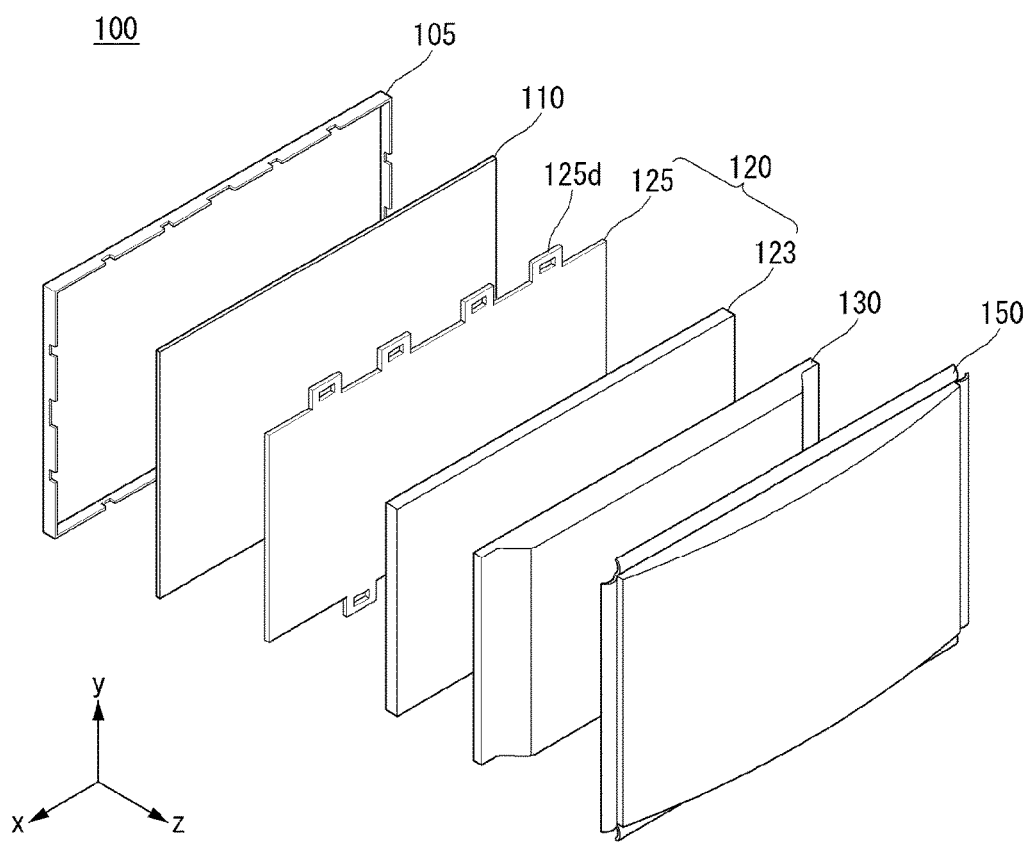

As shown in FIG. 3, the display device 100 according to the embodiment of the invention may include a front cover 105, the display panel 110, a backlight unit 120, a frame 130, and the back cover 150.

The front cover 105 may cover at least a portion of a front surface and a side surface of the display panel 110. The front cover 105 may have a rectangular frame shape, in which a center portion is empty. Because the center portion of the front cover 105 is empty, an image displayed on the display panel 110 may be seen to the outside.

The front cover 105 may include a front cover and a side cover. Namely, the front cover 105 may include the front cover positioned at the front surface of the display panel 110 and the side cover positioned on the side surface of the display panel 110. The front cover and the side cover may be separately configured. One of the front cover and the side cover may be omitted. For example, the front cover may be omitted, and only the side cover may be absent in terms of an attractive appearance of the display device 100.

The display panel 110 may be positioned at a front surface of the display device 100 and may display an image. The display panel 110 may divide the image into a plurality of pixels and may output the image while controlling color, brightness, and chroma of each pixel. The display panel 110 may include an active area, on which the image is displayed, and an inactive area, on which the image is not displayed. The display panel 110 may include a front substrate and a back substrate which are positioned opposite each other with a liquid crystal layer interposed therebetween.

The front substrate may include a plurality of pixels each including red, green, and blue subpixels. The front substrate may generate an image corresponding to the red, green, or blue color in response to a control signal.

The back substrate may include switching elements. The back substrate may turn on pixel electrodes. For example, the pixel electrode may change a molecule arrangement of the liquid crystal layer in response to a control signal received from the outside. The liquid crystal layer may include a plurality of liquid crystal molecules. The arrangement of the liquid crystal molecules may change depending on a voltage difference between the pixel electrode and a common electrode. The liquid crystal layer may transfer light provided by the backlight unit 120 to the front substrate.

The backlight unit 120 may be positioned in the rear of the display panel 110. The backlight unit 120 may include a plurality of light sources. The light sources of the backlight unit 120 may be arranged in an edge type or a direct type. In the instance of the direct type backlight unit 120, a diffusion plate may be added.

The backlight unit 120 may be coupled to a front surface and a side surface of the frame 130. For example, the plurality of light sources may be disposed inside one side of the frame 130. In this instance, the backlight unit 120 may be commonly called the edge type backlight unit 120.

The backlight unit 120 may be driven in an entire driving method or a partial driving method, such as a local dimming method and an impulsive driving method. The backlight unit 120 may include an optical sheet 125 and an optical layer 123.

The optical sheet 125 can cause light of the light sources to be uniformly transferred to the display panel 110. The optical sheet 125 may include a plurality of layers. For example, the optical sheet 125 may include at least one prism sheet and/or at least one diffusion sheet.

The optical sheet 125 may further include at least one coupling portion 125d. The coupling portion 125d may be coupled to the front cover 105 and/or the back cover 150. Namely, the coupling portion 125d may be directly coupled to the front cover 105 and/or the back cover 150. Alternatively, the coupling portion 125d may be coupled to a structure formed on the front cover 105 and/or the back cover 150. Namely, the coupling portion 125d may be indirectly coupled to the front cover 105 and/or the back cover 150.

The optical layer 123 may include the light source, etc. Configuration of the optical layer 123 is described in detail in the corresponding paragraphs.

The frame 130 may function to support the components of the display device 100. For example, the frame 130 may be coupled to the backlight unit 120. The frame 130 may be formed of a metal material, for example, an aluminum alloy.

The back cover 150 may be positioned at a back surface of the display device 100. The back cover 150 may protect inner configuration of the display device 100 from the outside. At least a portion of the back cover 150 may be coupled to the frame 130 and/or the front cover 105. The back cover 150 may be an injection production (or injection molded) formed of a resin material.

Figure 4:
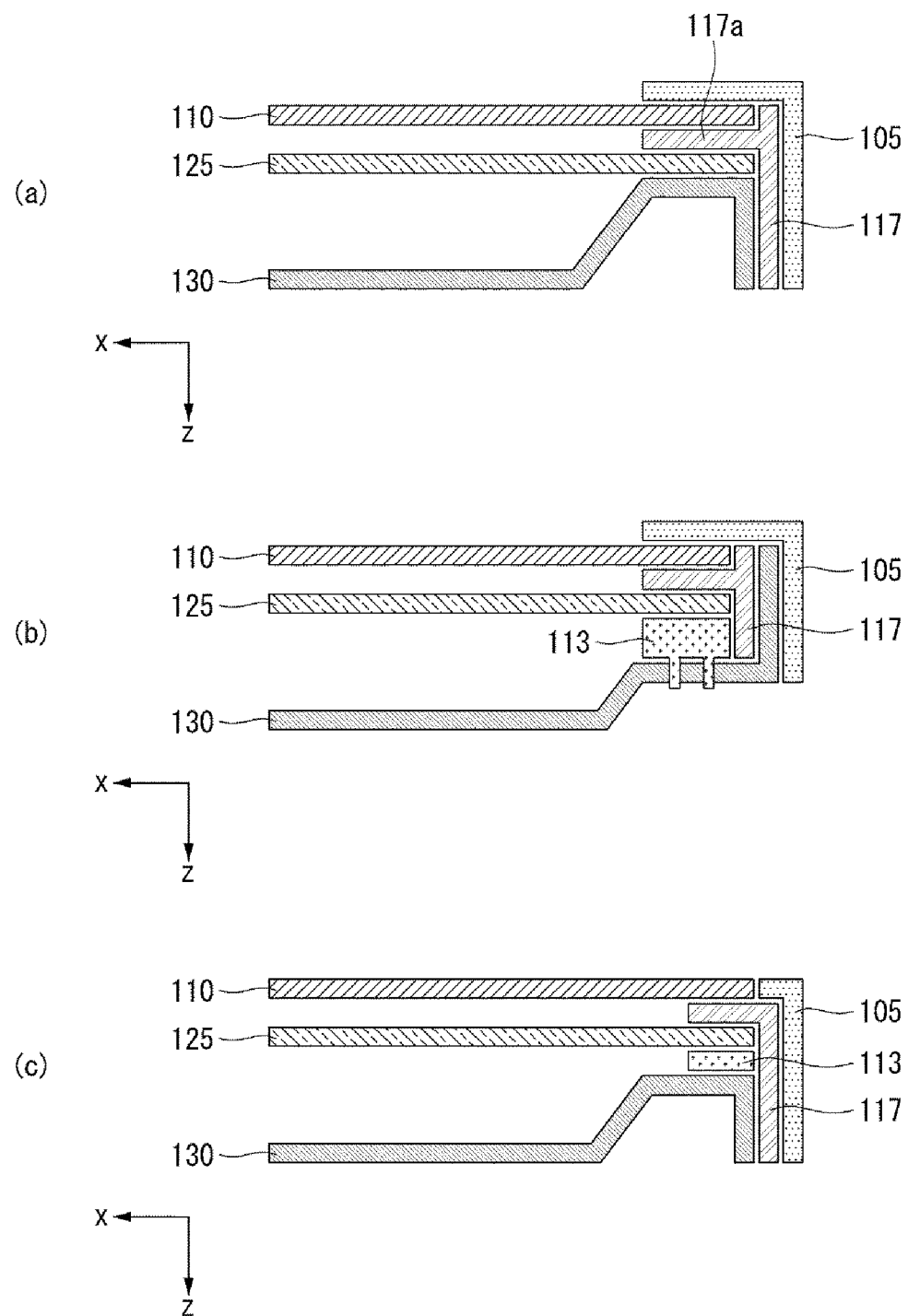
Figure 5:
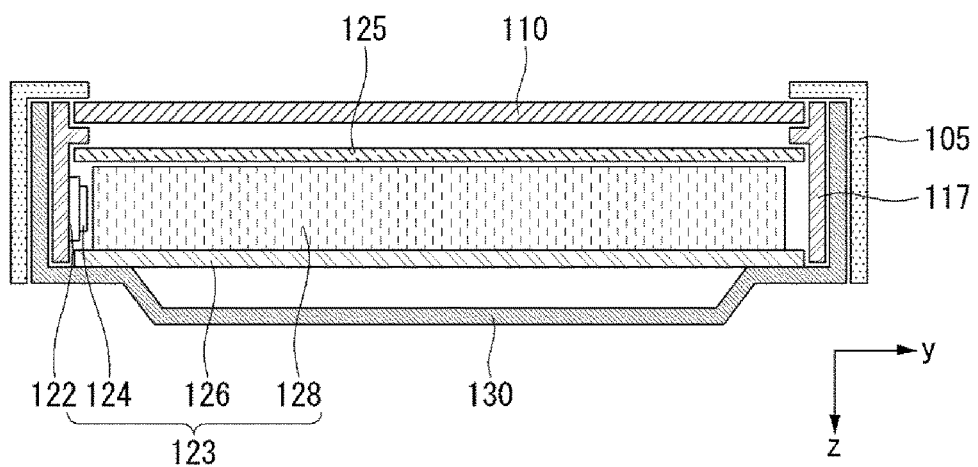

FIGS. 4 and 5 illustrate configuration of the optical sheet 125.

As shown in (a) of FIG. 4, the optical sheet 125 may be positioned in front of the frame 130. The optical sheet 125 may be coupled with the frame 130 at an edge of the frame 130. The optical sheet 125 may be directly placed at the edge of the frame 130. Namely, the optical sheet 125 may be supported by the frame 130. A surface of an edge of the optical sheet 125 may be surrounded by a first guide panel 117. For example, the optical sheet 125 may be positioned between the edge of the frame 130 and a flange 117a of the first guide panel 117.

The display panel 110 may be positioned at a front surface of the optical sheet 125. An edge of the display panel 110 may be coupled with the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 4, the display device 100 according to the embodiment of the invention may further include a second guide panel 113. The optical sheet 125 may be coupled with the second guide panel 113. Namely, the second guide panel 113 may be coupled with the frame 130, and the optical sheet 125 may be coupled with the second guide panel 113. The second guide panel 113 may be formed of a material different from the frame 130. The frame 130 may have a shape surrounding the first and second guide panels 117 and 113. The first guide panel 117 or the second guide panel 113 may be called a holder or a supporting member.

As shown in (c) of FIG. 4, in the display device 100 according to the embodiment of the invention, the front cover 105 may not cover the front surface of the display panel 110. Namely, one end of the front cover 105 may be positioned on the side of the display panel 110.

As shown in FIG. 5, the optical layer 123 may include a substrate 122, a reflective sheet 126, a light assembly 124, and a light guide plate 128.

The optical layer 123 may be positioned in front of the frame 130. For example, the optical layer 123 may be positioned between the frame 130 and the optical sheet 125. The optical layer 123 may be supported by the frame 130.

The substrate 122 may be positioned inside the frame 130. The substrate 122 may be coupled with the first guide panel 117. The substrate 122 may be directly coupled with the first guide panel 117. For example, the substrate 122 may be configured such that the substrate 122 is coupled with at least one of the first guide panel 117, the frame 130, and the front cover 105.

The substrate 122 may be positioned adjacent to a side of the reflective sheet 124 and/or a side of the light guide plate 128. Namely, a front surface of the substrate 122 may face toward the optical layer 123. The substrate 122 may be separated from the reflective sheet 124 and/or the light guide plate 128 by a predetermined distance. Configurations of the substrate 122 and the optical layer 123 are described in detail in the corresponding paragraphs.

Figure 6:
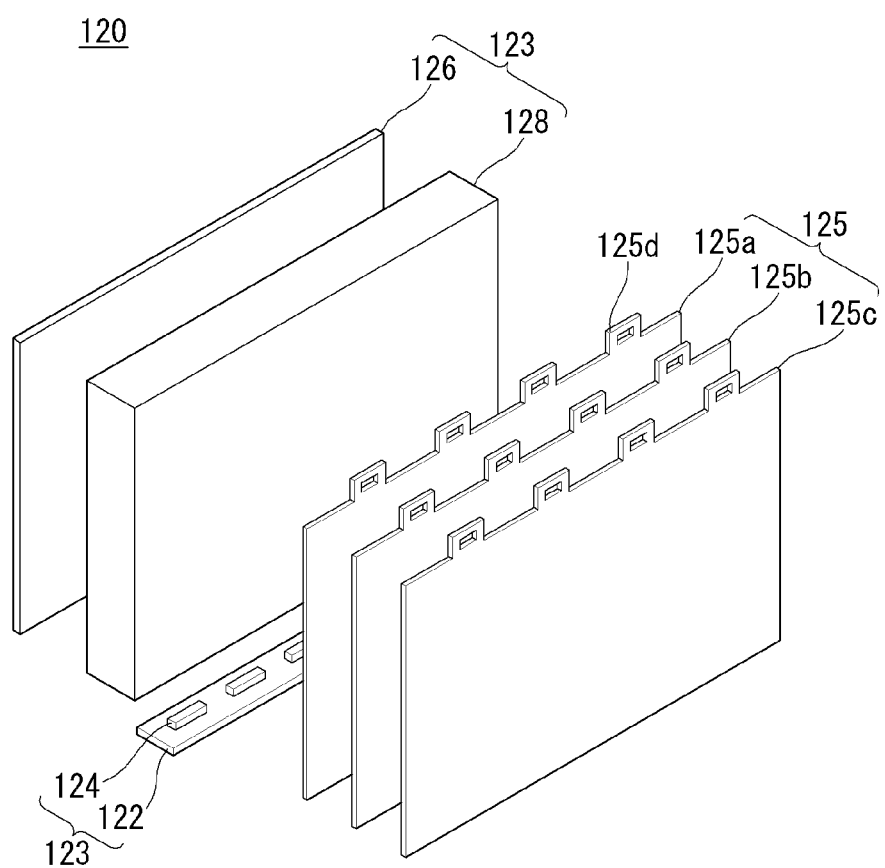

Referring to FIGS. 6 and 7, the backlight unit 120 may include an optical layer 123 including a substrate 122, at least one light assembly 124, a reflective sheet 126, and a light guide plate 128 and an optical sheet 125 positioned on a front surface of the optical layer 123.

The substrate 122 may be positioned on at least one side of the components of the optical layer 123. The substrate 122 may extend in a width direction of the components of the optical layer 123.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB), on which at least one light assembly 124 is mounted.

The light assemblies 124 may be disposed on the substrate 122 at predetermined intervals. A width of the light assembly 124 in a longitudinal direction may be less than a width of the light guide plate 128 in a thickness direction. Thus, most of light emitted from the light assembly 124 may be transferred to the inside of the light guide plate 128.

The light assembly 124 may be a light emitting diode (LED) chip or a LED package having at least one LED chip.

The light assembly 124 may be configured as a colored LED emitting at least one of red, green, and blue light or a white LED. The colored LED may include at least one of a red LED, a green LED, and a blue LED.

A light source included in the light assembly 124 may be a COB (Chip-On-Board) type. The COB light source may be configured such that the LED chip as the light source is directly coupled with the substrate 122. Thus, a process may be simplified. Further, a resistance may be reduced, and a loss of energy resulting from heat may be reduced. Namely, power efficiency of the light assembly 124 may increase. The COB light source may provide the brighter lighting and may be implemented to be thinner and lighter than a related art.

The light guide plate 128 may be positioned in front of the light assembly 124. The light guide plate 128 may function to widely spread light emitted from the light assembly 124. Although not shown, a surface of the light guide plate 128 adjacent to the light assembly 124 may have a stepped shape. A lower surface of the light guide plate 128 may be upwardly inclined and thus may forwardly reflect light emitted from the light assembly 124.

The reflective sheet 126 may be positioned in the rear of the light guide plate 128. The reflective sheet 126 may forwardly reflect light emitted from the light assembly 124. Further, the reflective sheet 126 may forwardly reflect again light reflected from the light guide plate 128.

The reflective sheet 126 may include at least one of metal and metal oxide, each of which is a reflection material. The reflective sheet 126 may include metal and/or metal oxide having a high reflectance, for example, at least one of aluminum (Al), silver (Ag), gold (Au), and titanium dioxide ($TiO_2$).

The reflective sheet 126 may be formed by depositing and/or coating the metal or the metal oxide. An ink including the metal material may be printed on the reflective sheet 126. A deposition layer may be formed on the reflective sheet 126 using a thermal deposition method, an evaporation method, or a vacuum deposition method such as a sputtering method. A coating layer and/or a printing layer may be formed on the reflective sheet 126 using a printing method, a gravure coating method or a silk screen method.

A diffusion plate (not shown) may be added on a front surface of the light guide plate 128. The diffusion plate may forwardly diffuse light emitted from the light guide plate 128.

An air gap may be positioned between the light guide plate 128 and the optical sheet 125. The air gap may serve as a buffer capable of widely spreading light emitted from the light assembly 124. A resin may be deposited on the light assembly 124 and/or the reflective sheet 126. The resin may function to diffuse light emitted from the light assembly 124.

The optical sheet 125 may be positioned in front of the light guide plate 128. A back surface of the optical sheet 125 may be adhered to the light guide plate 128, and the front surface of the optical sheet 125 may be adhered to the back surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

The optical sheet 125 may include a plurality of sheets having different functions. For example, the optical sheet 125 may include first to third optical sheets 125a to 125c. The first optical sheets 125a may function as a diffusion sheet, and the second and third optical sheets 125b and 125c may function as a prism sheet. A number and/or a position of the diffusion sheets and the prism sheets may be changed. For example, the optical sheet 125 may include the first optical sheets 125a as the diffusion sheet and the second optical sheet 125b as the prism sheet.

The diffusion sheet may prevent light coming from the light guide plate 128 from being partially concentrated and may further uniformize a luminance of the light. The prism sheet may concentrate light coming from the diffusion sheet and may make the concentrated light be vertically incident on the display panel 110.

The coupling portion 125d may be formed on at least one of edges of the optical sheet 125. The coupling portion 125d may be formed on at least one of the first to third optical sheets 125a to 125c.

The coupling portion 125d may be formed at an edge of a long side of the optical sheet 125. The coupling portion 125d formed on the first long side may be asymmetric to the coupling portion 125d formed on a second long side of the optical sheet 125. For example, a number and/or a position of the coupling portions 125d formed on the first long side may be different from a number and/or a position of the coupling portions 125d formed on the second long side.

Figure 8:
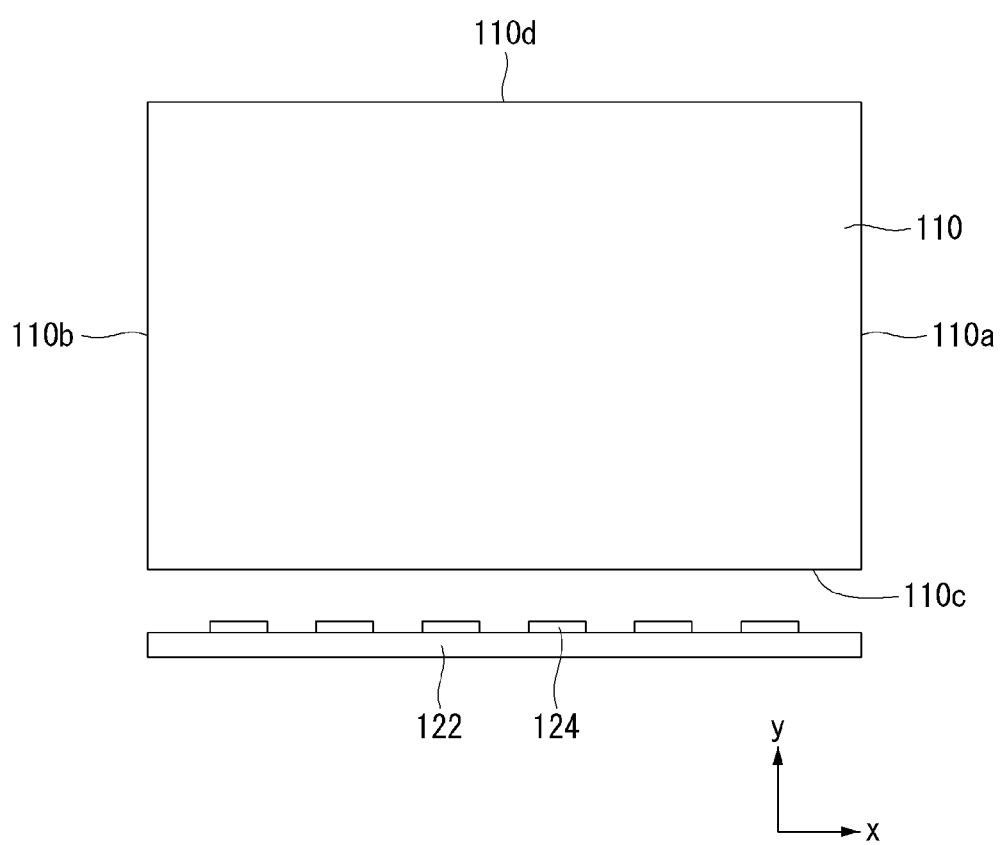
Figure 9:
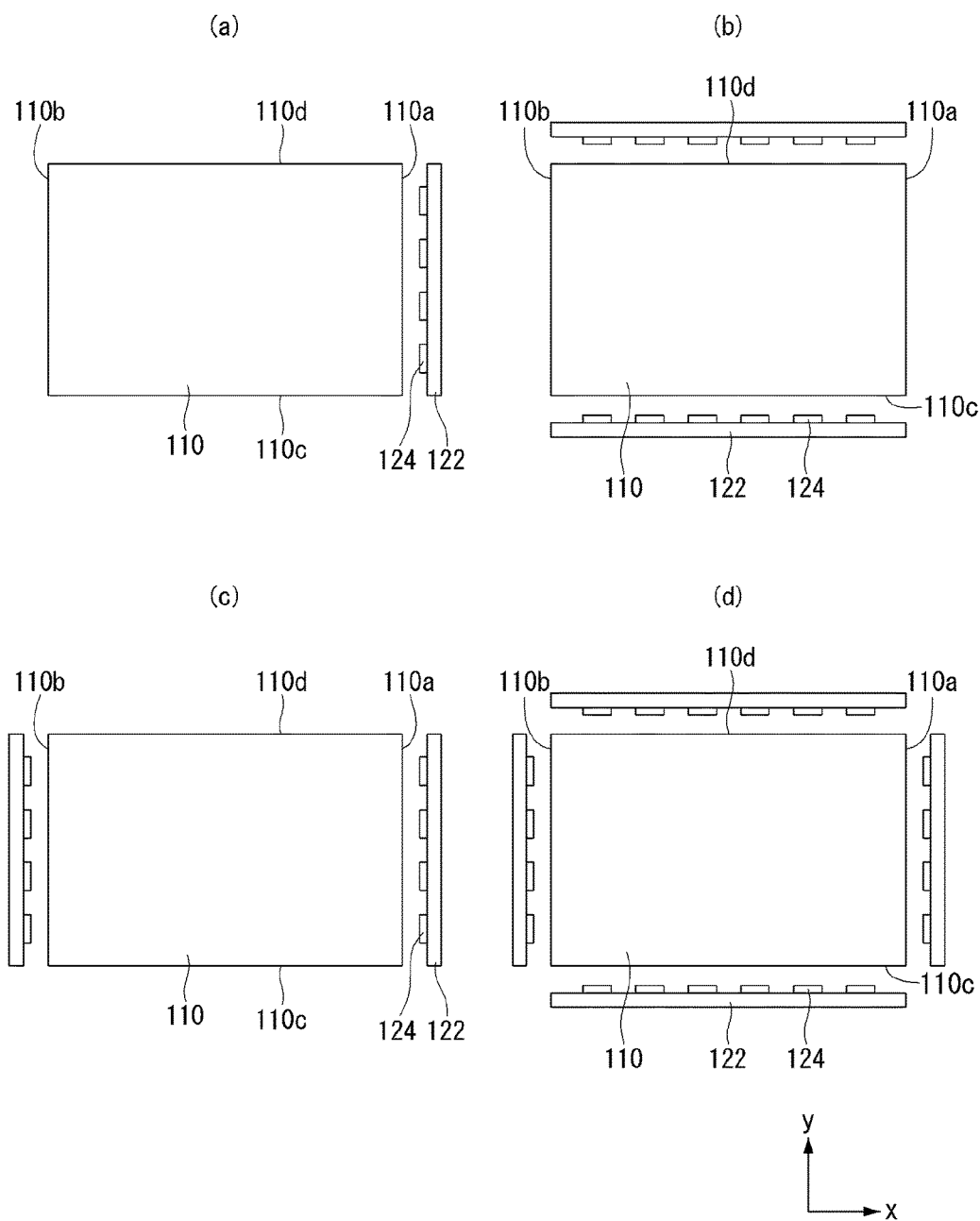

Referring to FIGS. 8 and 9, the substrate 122 and the light assembly 124 may be positioned at a lower side surface 110c of the display panel 110. The backlight unit, in which the light assembly 124 is disposed on the side of the display panel 110, may be referred to as an edge type backlight unit.

As shown in FIG. 8, the light assembly 124 may emit light in a direction from the lower side surface 110c to an upper side surface 110d of the display panel 110. Namely, light emitted from the light assembly 124 may be diffused from the lower side surface 110c to the upper side surface 110d of the display panel 110 and may be entirely transferred to the display panel 110. Other configuration may be used for the light assembly 124. For example, the light assembly 124 may be positioned at the upper side surface 110d of the display panel 110.

As shown in (a) of FIG. 9, the light assembly 124 may be positioned at a right side surface 110a of the display panel 110. Other configuration may be used for the light assembly 124. For example, the light assembly 124 may be positioned at a left side surface 110b of the display panel 110.

As shown in (b) of FIG. 9, the light assembly 124 may be positioned at the lower side surface 110c and the upper side surface 110d of the display panel 110. Further, as shown in (c) of FIG. 9, the light assembly 124 may be positioned on the right side surface 110a and the left side surface 110b of the display panel 110.

As shown in (b) and (c) of FIG. 9, the backlight unit, in which the light assembly 124 is disposed on two opposite sides of the display panel 110, may be referred to as a dual type backlight unit. The dual type backlight unit may easily diffuse light having a weaker intensity into the entire surface of the display panel 110.

As shown in (d) of FIG. 9, the light assembly 124 may be positioned on the four sides of the display panel 110. If the light assembly 124 is positioned on the four sides of the display panel 110, the light assembly 124 on the four sides of the display panel 110 may diffuse light more easily than other backlight unit.

Figure 10:
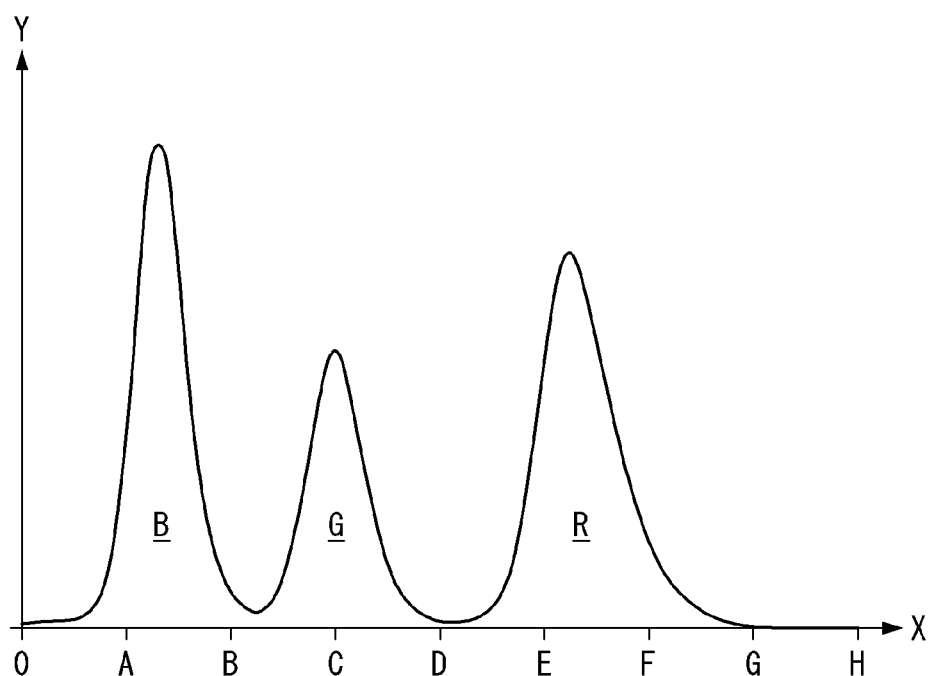
FIGS. 10 and 11 illustrate examples of a graph with respect to a wavelength of light.

FIG. 10 illustrates examples of a graph with respect to a wavelength of light.

In FIG. 10, X-axis denotes a wavelength of light, and Y-axis denotes an intensity of light. For example, in the X-axis, O may be 380 nm; A may be 430 nm; B may be 480 nm; C may be 530 nm; D may be 580 nm; E may be 630 nm; F may be 680 nm; G may be 730 nm, and H may be 780 nm. Further, in the Y-axis, "B" may be an intensity or a distribution of blue-based light; "G" may be an intensity or a distribution of green-based light; and "R" may be an intensity or a distribution of red-based light.

FIG. 10 illustrates the blue-based light, the green-based light, and the red-based light are uniformly distributed. Further, the blue-based light, the green-based light, and the red-based light are separately distributed and thus implement good color reproduction. This is because the display device 100 represents various colors through combination of blue, green, and blue light.

Figure 11:
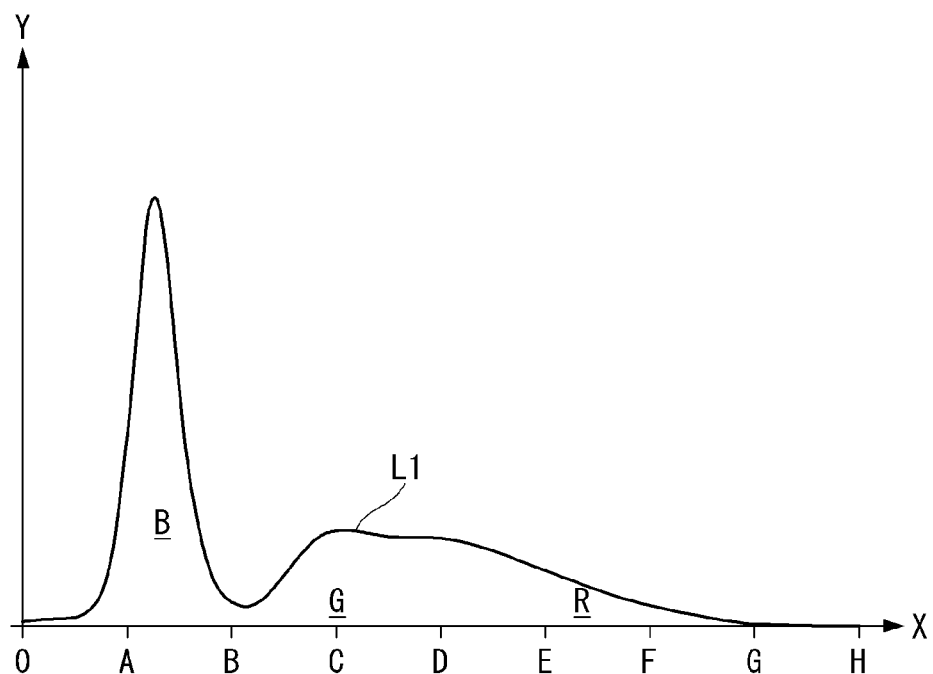

FIG. 11 illustrates a distribution of light provided by the backlight unit. More specifically, FIG. 11 illustrates a distribution of wavelengths of light provided by the light assembly 124. The light assembly 124 may include an LED as a light source. The LED may emit white light. In this instance, the LED emitting white light may be formed by packaging a yellow-based fluorescent material into a blue LED. The light source having such a configuration may provide light of the wavelength and/or the intensity shown in FIG. 11.

In FIG. 11, green-based light G and red-based light R may not be definitely separated. Namely, configuration, for example, a peak for definitely separating the green-based light G from the red-based light R is not shown in FIG. 11. In this instance, the color reproduction of the display device 100 may be reduced. This may lead to a reduction in image quality of the display device 100.

FIGS. 12 to 16 illustrate examples of forming a pattern according to an example embodiment of the invention.

Figure 12:
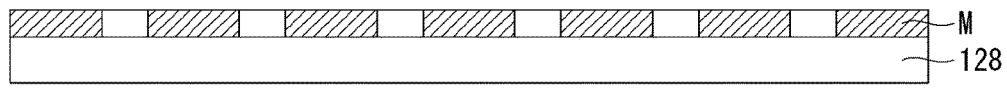
FIGS. 12 to 16 illustrate examples of forming a pattern according to an example embodiment of the invention.

Referring to FIG. 12, a mask M may be disposed on one surface of a light guide plate 128. The mask M may have a pattern. The pattern of the mask M may be formed while passing through the mask M.

Figure 13:

Referring to FIG. 13, an ink 200 may be applied to the mask M on the light guide plate 128. The ink 200 may include particles capable of scattering light. The ink 200 may include a light absorbing material. The ink 200 may simultaneously include particles capable of scattering light and a light absorbing material.

The light absorbing material may selectively absorb light. Namely, the ink 200 may scatter light, and at the same time may selectively absorb light. Thus, a light absorbing pattern, a light absorbing portion, a light absorbing pad, or a light absorbing dot, which will be described later, may include the following light absorbing material.

For example, the light absorbing material may include sub-phthalocyanine compound of the following Chemical Formula 1.

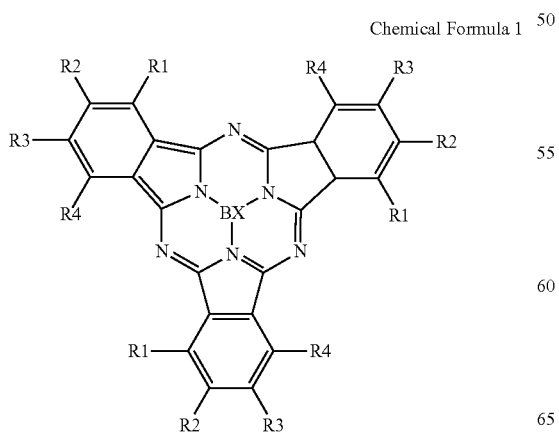

Chemical Formula 1

In the above Chemical Formula 1, each of R1 to R4 is individually selected from the group consisting of hydrogen; alkyl group, alkoxy, or alkylamine each having 1 to 6 carbon atoms; phenyl group; alkyl phenyl group; nitro group or halogen-substituted phenoxy group; nitro group; halogen; and cyano group. X is F, Cl, or Br.

As another example, the light absorbing material may further include compounds of the following Chemical Formulas 2 to 4.

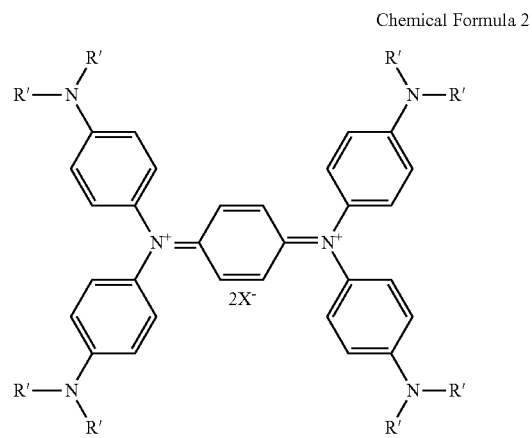

Chemical Formula 2

In the above Chemical Formula 2, R' is alkyl group having 1 to 6 carbon atoms, and Y is $ClO_{4-}$, $Ab_2F_{6-}$, $BF_{3-}$, toluenesulfonate, or benzenesulfonate negative ion.

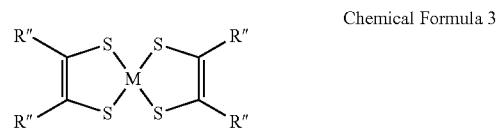

Chemical Formula 3

In the above Chemical Formula 3, M is Ni, Pb or Pt, and R" is hydrogen; alkyl group or alkoxy group each having 1 to 10 carbon atoms; halogen-substituted phenyl or alkylamine-substituted phenyl; or phenyl group.

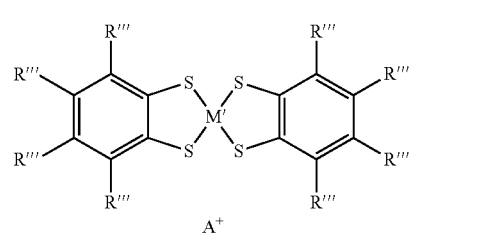

Chemical Formula 4

In the above Chemical Formula 4, M' is Fe, Ni, Cu, Co or Pt, and R''' is hydrogen; alkyl group or alkoxy group each having 1 to 10 carbon atoms; halogen; or nitro group. $A^+$ is tetraalkylammonium positive ion, where alkyl group has 1 to 6 carbon atoms.

As another example, the light absorbing material may include tetraaza porphyrin derivatives of the following Chemical Formula 5.

Chemical Formula 5

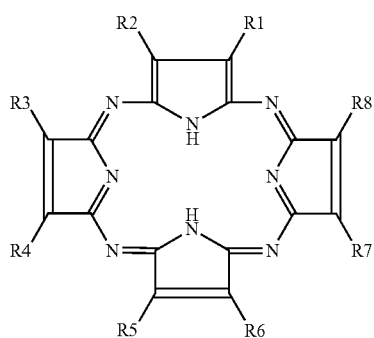

In the above Chemical Formula 5, each of R1, R2, R3, R4, R5, R6, R7 and R8 is individually selected from the group consisting of hydrogen; unsubstituted phenyl group; alkyl group having 1 to 8 carbon atoms; alkoxy group having 1 to 8 carbon atoms; nitro group; halogen atom; halide; cyano group; alkylamine group having 1 to 8 carbon atoms; aminoalkyl group having 1 to 8 carbon atoms; and phenyl group having a substituent selected among alkyl group having 1 to 8 carbon atoms, alkoxy group having 1 to 8 carbon atoms, nitro group, halogen atom, halide, alkylamine group having 1 to 8 carbon atoms, aminoalkyl group having 1 to 8 carbon atoms, and cyano group. Or, two adjacent substituents selected among substituents of R1, R2, R3, R4, R5, R6, R7 and R8 are combined and are substituted with a compound having 1 to 3 rings selected from aromatic ring compounds of the following Chemical Formula 6a-f, and remaining substituents are individually selected from the group consisting of hydrogen; alkyl group having 1 to 8 carbon atoms; alkoxy group having 1 to 8 carbon atoms; allyl group; halogen atom; halide; cyano group; and nitro group.

Chemical Formula 6a

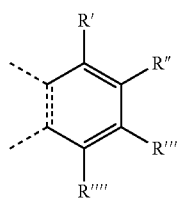

Chemical Formula 6b

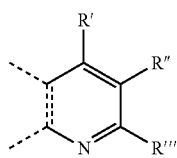

Chemical Formula 6c

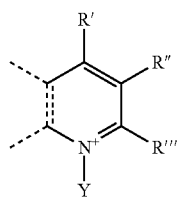

Chemical Formula 6d

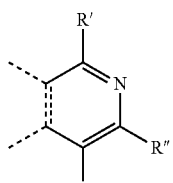

Chemical Formula 6e

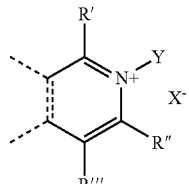

Chemical Formula 6f

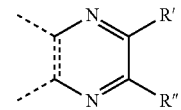

As another example, the light absorbing material may include tetraaza porphyrin derivatives of the following Chemical Formula 7.

Chemical Formula 7

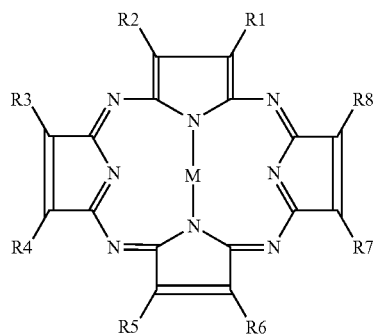

In the above Chemical Formula 7, each of R1, R2, R3, R4, R5, R6, R7 and R8 is individually selected from the group consisting of hydrogen; unsubstituted phenyl group; alkyl group having 1 to 8 carbon atoms; alkoxy group having 1 to 8 carbon atoms; nitro group; halogen atom; halide; cyano group; alkylamine group having 1 to 8 carbon atoms; aminoalkyl group having 1 to 8 carbon atoms; and phenyl group having a substituent selected among alkyl group having 1 to 8 carbon atoms, alkoxy group having 1 to 8 carbon atoms, nitro group, halogen atom, halide, alkylamine group having 1 to 8 carbon atoms, aminoalkyl group having 1 to 8 carbon atoms, and cyano group. Or, two adjacent substituents selected among substituents of R1, R2, R3, R4, R5, R6, R7 and R8 are combined and are substituted with a compound having 1 to 3 rings selected from aromatic ring compounds of the above Chemical Formula 6a-f, and remaining substituents are individually selected from the group consisting of hydrogen; alkyl group having 1 to 8 carbon atoms; alkoxy group having 1 to 8 carbon atoms; allyl group; halogen atom; halide; cyano group; and nitro group. M is metal ion, which has two oxygen atoms and forms a complex along with tetraaza porphyrin ring, or metal ion having a ligand, which has two oxygen atoms, forms a complex along with tetraaza porphyrin ring, and can form a coordinate bond along with the metal ion.

As another example, the light absorbing material may further include compounds of the following Chemical Formulas 8 to 10.

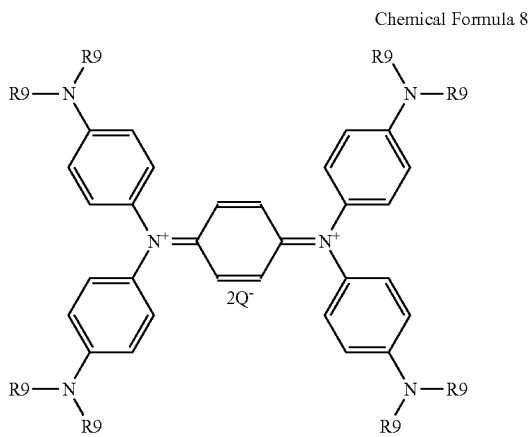

Chemical Formula 8

In the above Chemical Formula 8, R9 is alkyl group having 1 to 6 carbon atoms, and Q is $ClO_4$, $Ab_2F_6$, $BF_3$, toluenesulfonate, or benzenesulfonate.

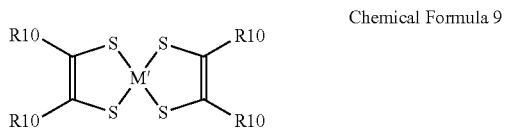

Chemical Formula 9

In the above Chemical Formula 9, M' is Ni, Pd or Pt, and R10 is hydrogen or alkyl group or alkoxy group having 1 to 10 carbon atoms; halogen- or alkylamine-substituted phenyl; or phenyl group.

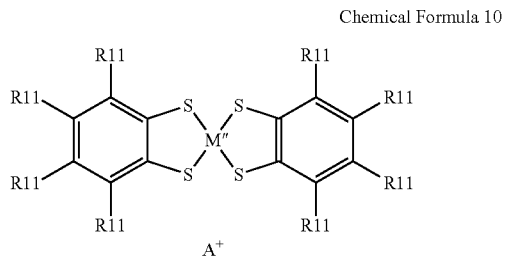

Chemical Formula 10

In the above Chemical Formula 10, M''' is Fe, Ni, Cu, Co or Pt, and R11 is hydrogen; alkyl group or alkoxy group each having 1 to 10 carbon atoms; halogen; or nitro group. $A^+$ is tetraalkylammonium positive ion, where alkyl group has 1 to 6 carbon atoms.

Figure 14:
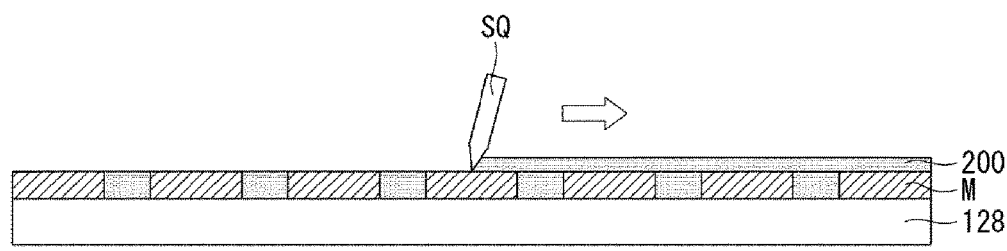

Referring to FIG. 14, the ink 200 applied to the pattern mask M may be removed using a squeezer SQ.

Figure 15:
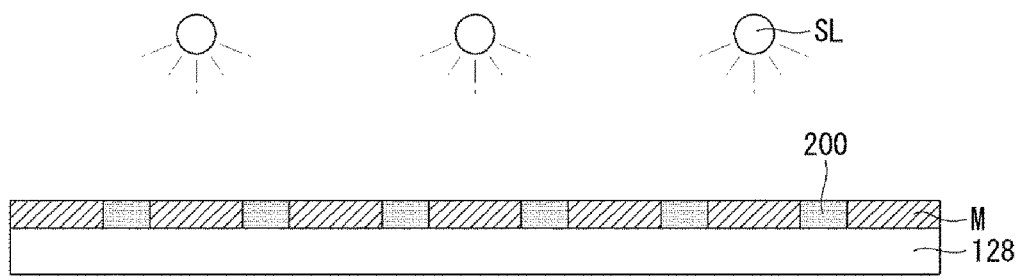

Referring to FIG. 15, the ink 200 remaining on the pattern mask M may be hardened. The remaining ink 200 may be hardened by light SL.

Figure 17:
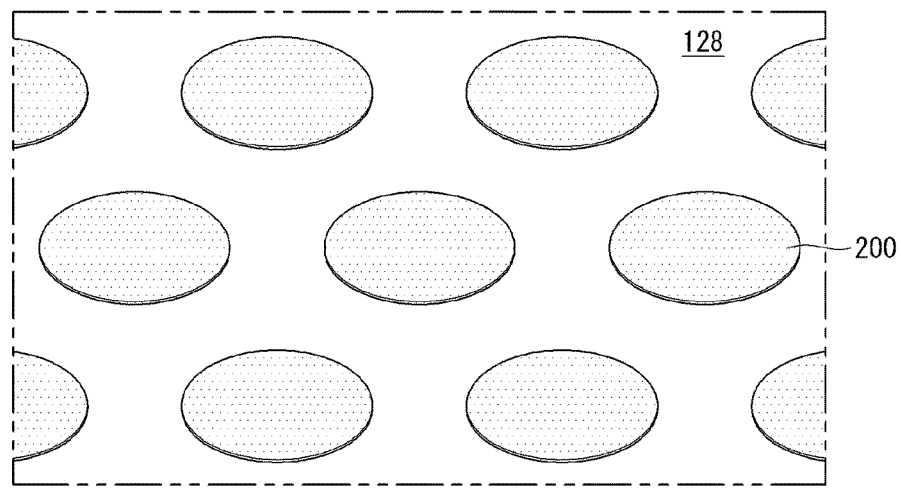
FIG. 17 illustrates an example of a pattern according to an example embodiment of the invention.

FIG. 17 illustrates an example of a pattern according to an example embodiment of the invention.

Figure 16:
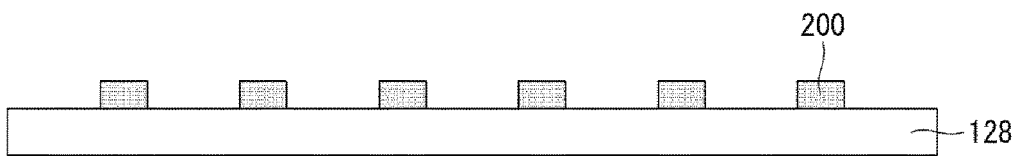

FIGS. 16 and 17 show a light guide plate 128, of which one surface includes an ink 200 forming a pattern.

In FIG. 16, the hardened ink 200 may be a reflective pattern and a light absorbing pattern. For example, because the ink 200 may include a reflective material and/or a light absorbing material before hardening, the ink 200 may be a reflective pattern and/or a light absorbing pattern after hardening. The reflective pattern may be referred to as a reflective portion, and the light absorbing pattern may be referred to as a light absorbing portion. Depending on a scale of the hardened ink 200, the reflective pattern or the reflective portion may be referred to as a reflective pad or a reflective dot, and the light absorbing pattern or the light absorbing portion may be referred to as a light absorbing pad or a light absorbing dot. The reflective pad may be a first pad, and the light absorbing pad may be a second pad. Further, the reflective dot may be a first dot, and the light absorbing dot may be a second dot. They may be mainly used in plural form, but do not exclude singular form. They may be equally defined in the following description.

Referring to FIG. 17, a light absorbing and reflective pattern 200 may be formed on one surface of the light guide plate 128. The one surface of the light guide plate 128 may be a lower surface. Namely, the one surface of the light guide plate 128 may be the opposite surface of a surface facing the display panel 110.

Figure 18:
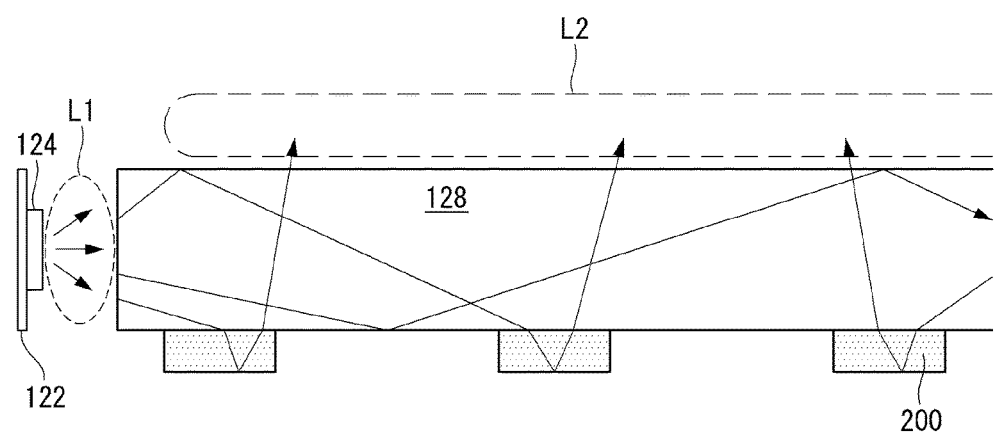
FIG. 18 illustrates an example of light reflection of a light guide plate according to an example embodiment of the invention.

FIG. 18 illustrates an example of light reflection of a light guide plate according to an example embodiment of the invention.

Light L1 emitted from the light assembly 124 may travel toward a light guide plate 128. In this instance, the light L1 provided by the light assembly 124 may have the distribution of light described in FIG. 11. Namely, when the light L1 provided by the light assembly 124 is incident on the display panel 110 through the light guide plate 128, color reproduction of an image displayed on the display panel 110 may be insufficient in representing a natural color.

The light L1 provided by the light assembly 124 may be totally reflected and/or reflected from the light guide plate 128. In this instance, the light absorbing and reflective pattern 200 may reflect, refract, and/or scatter the light totally reflected and/or reflected from the light guide plate 128. And at the same time, the light absorbing and reflective pattern 200 may absorb a portion having a predetermined wavelength range among the light totally reflected and/or reflected from the light guide plate 128. Namely, light L2, which is provided for the display panel 110 through the light guide plate 128, may improve the color reproduction of the image displayed on the display panel 110, and also the uniform distribution of the light L2 may be improved.

Figure 19:
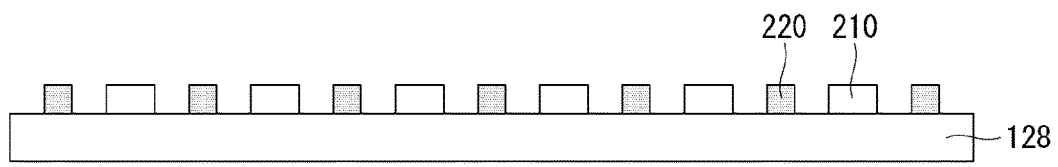
FIG. 19 illustrates another example of forming a pattern according to an example embodiment of the invention.
Figure 20:
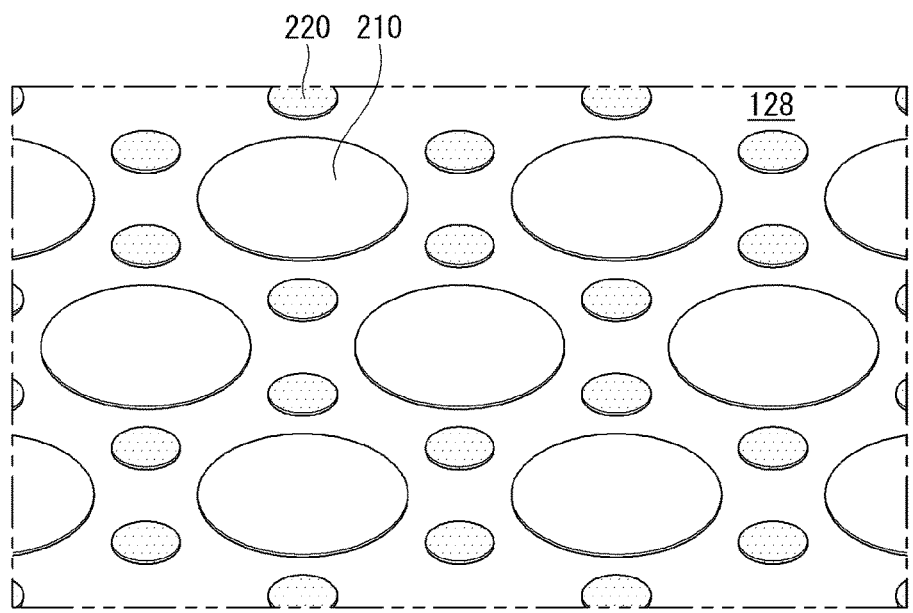
FIG. 20 illustrates another example of a pattern according to an example embodiment of the invention.

FIG. 19 illustrates another example of forming a pattern according to an example embodiment of the invention. FIG. 20 illustrates another example of a pattern according to an example embodiment of the invention.

Referring to FIGS. 19 and 20, a reflective pattern 210 may be formed on one surface of a light guide plate 128. A light absorbing pattern 220 may be formed on one surface of the light guide plate 128. The one surface of the light guide plate 128 may be a back surface of the light guide plate 128. Further, the one surface of the light guide plate 128 may be may be the opposite surface of a surface of the light guide plate 128 facing the display panel 110.

The reflective pattern 210 and/or the light absorbing pattern 220 may be formed through the process described with reference to FIGS. 12 to 15.

The reflective pattern 210 and the light absorbing pattern 220 may be separated from each other. The light absorbing pattern 220 may be formed around the reflective pattern 210. On the contrary, the reflective pattern 210 may be formed around the light absorbing pattern 220. The light absorbing pattern 220 may reduce a gap formed by the reflective pattern 210. On the contrary, the reflective pattern 210 may reduce a gap formed by the light absorbing pattern 220.

Hence, a reflectance or an absorptance of the reflective pattern 210 and/or the light absorbing pattern 220 may be further improved. This indicates that the color reproduction of the display panel 110 may be further improved.

Figure 21:
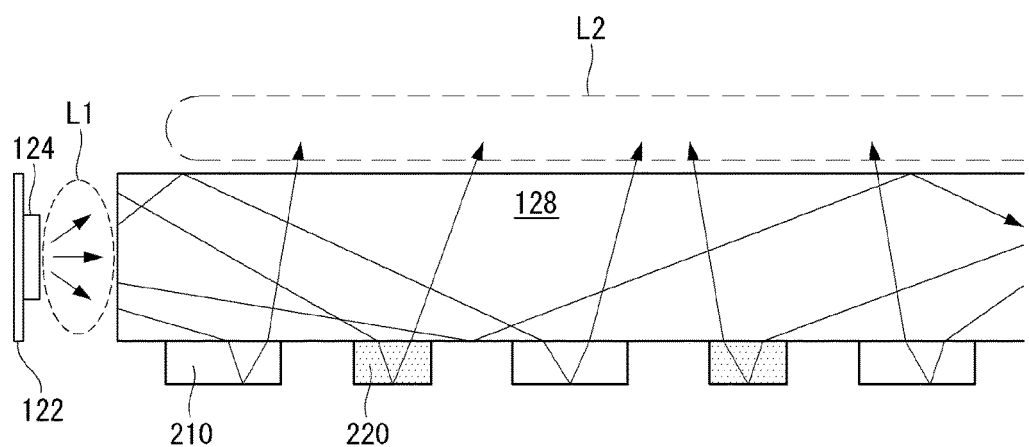
FIG. 21 illustrates another example of light reflection of a light guide plate according to an example embodiment of the invention.

FIG. 21 illustrates an example of light reflection of a light guide plate according to an example embodiment of the invention.

Light L1 emitted from the light assembly 124 may travel toward a light guide plate 128. In this instance, the light L1 provided by the light assembly 124 may have the distribution of light described in FIG. 11. Namely, when the light L1 provided by the light assembly 124 is incident on the display panel 110 through the light guide plate 128, color reproduction of an image displayed on the display panel 110 may be insufficient in representing a natural color.

The light L1 provided by the light assembly 124 may be totally reflected and/or reflected from the light guide plate 128. In this instance, a reflective pattern 210 and/or a light absorbing pattern 220 may reflect, refract, and/or scatter the light totally reflected and/or reflected from the light guide plate 128. And at the same time, the light absorbing pattern 220 may absorb a portion having a predetermined wavelength range among the light totally reflected and/or reflected from the light guide plate 128. Namely, light L2, which is provided for the display panel 110 through the light guide plate 128, may improve the color reproduction of the image displayed on the display panel 110, and also the uniform distribution of the light L2 may be further improved.

Namely, the light guide plate 128 including the reflective pattern 210 and the light absorbing pattern 220 as shown in FIG. 21 may further improve an illuminance or the uniform distribution of the light L2 provided for the display panel 110, and also may further improve the color reproduction of the image displayed on the display panel 110. In other words, the light guide plate 128 may provide the display panel 110 with the light L2, which is bright, is uniformly distributed, and in which wavelengths of red, green, and blue colors are separated.

Figure 22:
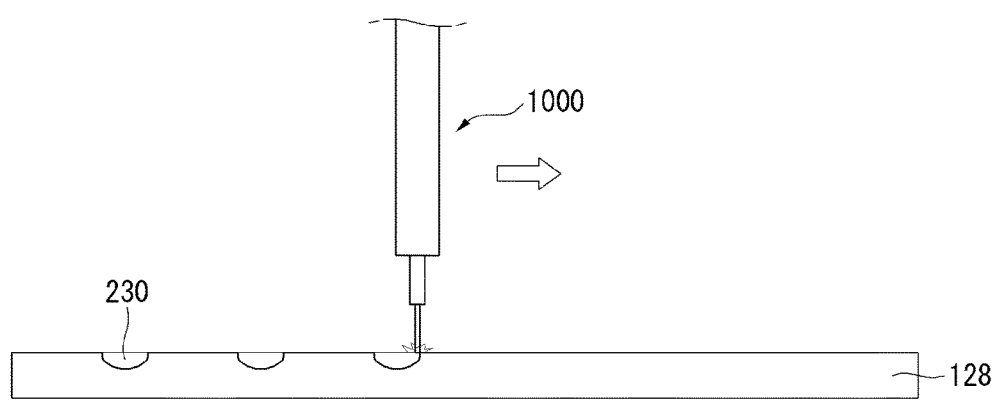
FIGS. 22 and 23 illustrate other examples of forming a pattern according to an example embodiment of the invention.
Figure 23:
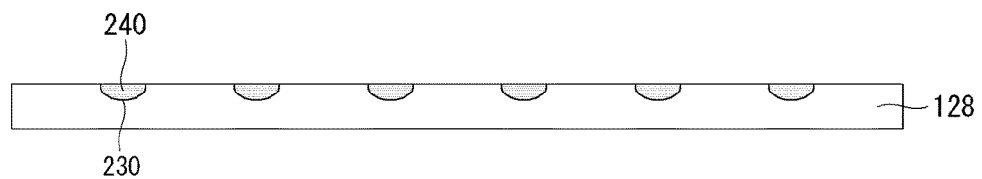

FIGS. 22 and 23 illustrate other examples of forming a pattern according to an example embodiment of the invention.

Referring to FIG. 22, one surface of a light guide plate 128 may have a groove. For example, the groove of the light guide plate 128 may be formed by processing one surface of the light guide plate 128 using a laser 1000. The plurality of grooves may be formed on the light guide plate 128. The plurality of grooves may form a reflective pattern 230. The plurality of grooves may be arranged at regular intervals or at irregular intervals. Namely, the plurality of grooves may form a regular pattern or an irregular pattern.

Referring to FIG. 23, a light absorbing pattern 240 may be formed on the reflective pattern 230 formed by the plurality of grooves. Namely, the light absorbing pattern 240 may be formed by filling the reflective pattern 230 with the above-described ink 200. Hence, the reflective pattern 230 and the light absorbing pattern 240 may be formed as one body.

Figure 24:
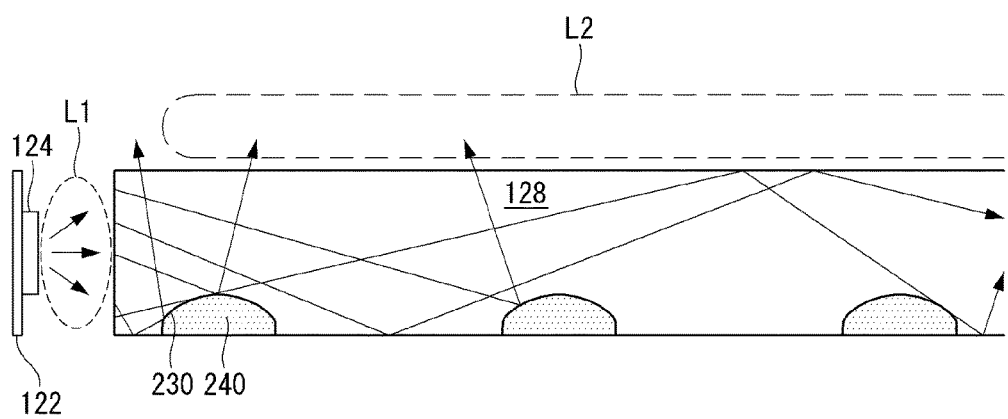
FIG. 24 illustrates another example of light reflection of a light guide plate according to an example embodiment of the invention.

FIG. 24 illustrates an example of light reflection of a light guide plate according to an example embodiment of the invention.

Light L1 emitted from the light assembly 124 may travel toward a light guide plate 128. In this instance, the light L1 provided by the light assembly 124 may have the distribution of light described in FIG. 11. Namely, when the light L1 provided by the light assembly 124 is incident on the display panel 110 through the light guide plate 128, color reproduction of an image displayed on the display panel 110 may be insufficient in representing a natural color.

The light L1 provided by the light assembly 124 may be totally reflected and/or reflected from the light guide plate 128. In this instance, a reflective pattern 230 and/or a light absorbing pattern 240 may reflect, refract, and/or scatter the light totally reflected and/or reflected from the light guide plate 128. And at the same time, the light absorbing pattern 240 may absorb a portion having a predetermined wavelength range among the light totally reflected and/or reflected from the light guide plate 128. Namely, light L2, which is provided for the display panel 110 through the light guide plate 128, may improve the color reproduction of the image displayed on the display panel 110, and also the uniform distribution of the light L2 may be further improved.

Figure 25:
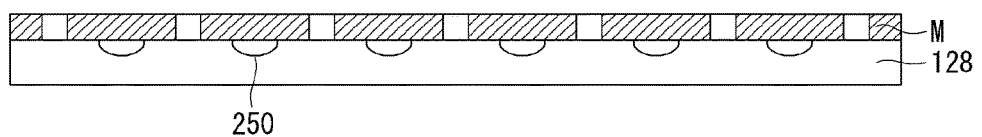
FIGS. 25 to 27 illustrate other examples of forming a pattern according to an example embodiment of the invention.
Figure 26:
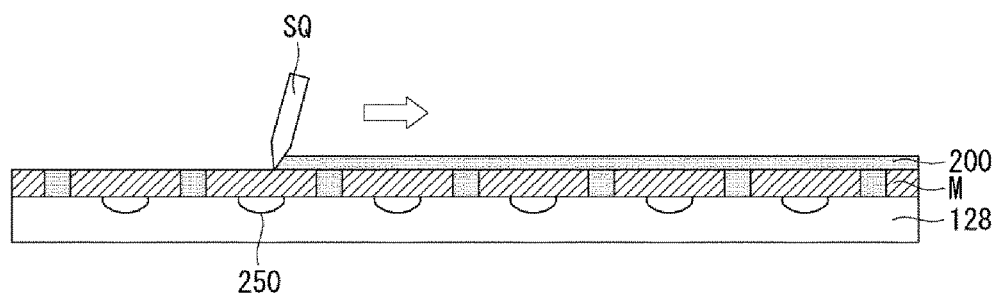
Figure 27:
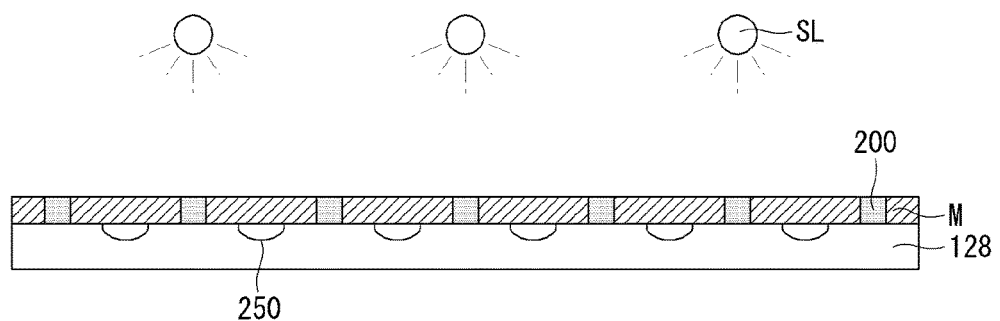

FIGS. 25 to 27 illustrate other examples of forming a pattern according to an example embodiment of the invention.

Referring to FIG. 25, a mask M may be disposed on a light guide plate 128, on which a reflective pattern 250 is formed. The reflective pattern 250 may be formed through the process described with reference to FIG. 22. The mask M may be disposed on a surface of the light guide plate 128, on which the reflective pattern 250 is formed. The mask M may have a plurality of holes, and the plurality of holes may form a pattern.

Referring to FIG. 26, an ink 200 may be applied to the mask M, and the ink 200 outside the plurality of holes of the mask M may be removed using a squeezer SQ.

Referring to FIG. 27, the ink 200 may be hardened. For example, the ink 200 may be optically hardened through light SL. The hardened ink 200 may form a light absorbing pattern 260. Further, the hardened ink 200 may perform a function of the reflective pattern.

Figure 28:
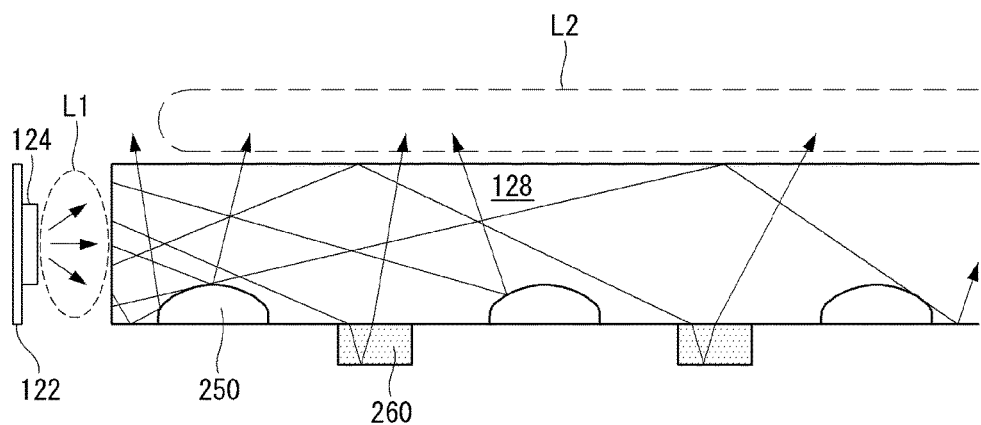
FIG. 28 illustrates another example of light reflection of a light guide plate according to an example embodiment of the invention.

FIG. 28 illustrates an example of light reflection of a light guide plate according to an example embodiment of the invention.

Light L1 emitted from the light assembly 124 may travel toward a light guide plate 128. In this instance, the light L1 provided by the light assembly 124 may have the distribution of light described in FIG. 11. Namely, when the light L1 provided by the light assembly 124 is incident on the display panel 110 through the light guide plate 128, color reproduction of an image displayed on the display panel 110 may be insufficient in representing a natural color.

The light L1 provided by the light assembly 124 may be totally reflected and/or reflected from the light guide plate 128. In this instance, a reflective pattern 250 and/or a light absorbing pattern 260 may reflect, refract, and/or scatter the light totally reflected and/or reflected from the light guide plate 128. And at the same time, the light absorbing pattern 260 may absorb a portion having a predetermined wavelength range among the light totally reflected and/or reflected from the light guide plate 128. Namely, light L2, which is provided for the display panel 110 through the light guide plate 128, may improve the color reproduction of the image displayed on the display panel 110, and also the uniform distribution of the light L2 may be further improved.

Namely, the light guide plate 128 including the reflective pattern 250 and the light absorbing pattern 260 as shown in FIG. 28 may further improve an illuminance or the uniform distribution of the light L2 provided for the display panel 110, and also may further improve the color reproduction of the image displayed on the display panel 110. In other words, the light guide plate 128 may provide the display panel 110 with the light L2, which is bright, is uniformly distributed, and in which wavelengths of red, green, and blue colors are separated.

FIGS. 29 and 30 illustrate other examples of a pattern of a light guide plate according to an example embodiment of the invention.

Referring to FIG. 29, a reflective pattern and/or a light absorbing pattern may have uniform distribution. In other words, the reflective pattern and/or the light absorbing pattern may have a uniform density. The reflective pattern and/or the light absorbing pattern may have a uniform distribution or a uniform density irrespective of changes of a light guide plate 128 in a length direction L or a width direction W.

Referring to FIG. 30, a reflective pattern and/or a light absorbing pattern may have non-uniform distribution. In other words, the reflective pattern and/or the light absorbing pattern may have a varying density. The reflective pattern and/or the light absorbing pattern may have linearity or nonlinearity depending on changes of a light guide plate 128 in a length direction L or a width direction W.

For example, the density of the reflective pattern and/or the density of the light absorbing pattern may increase as the reflective pattern and/or the light absorbing pattern is far away from the light assembly 124. As another example, the density of the reflective pattern and/or the density of the light absorbing pattern may increase as the reflective pattern and/or the light absorbing pattern goes from a center to an edge of the light guide plate 128. Hence, light provided by the light assembly 124 may be uniformly distributed through the light guide plate 128, and light having the improved color reproduction may be provided.

In the embodiment of the invention, changes in the size of the reflective pattern and/or the size of the light absorbing pattern may make the distribution difference or the density difference. Namely, the size of the reflective pattern and/or the size of the light absorbing pattern adjacent to the light assembly 124 may decrease, and the size of the reflective pattern and/or the size of the light absorbing pattern far away from the light assembly 124 may increase.

Further, the color characteristic of light may locally vary depending on the distribution difference or the density difference. Namely, a partial reduction in the image quality may be controlled by adjusting the size, the density, the distribution, etc. of the light absorbing pattern, and thus the image quality may entirely increase.

Figure 31:
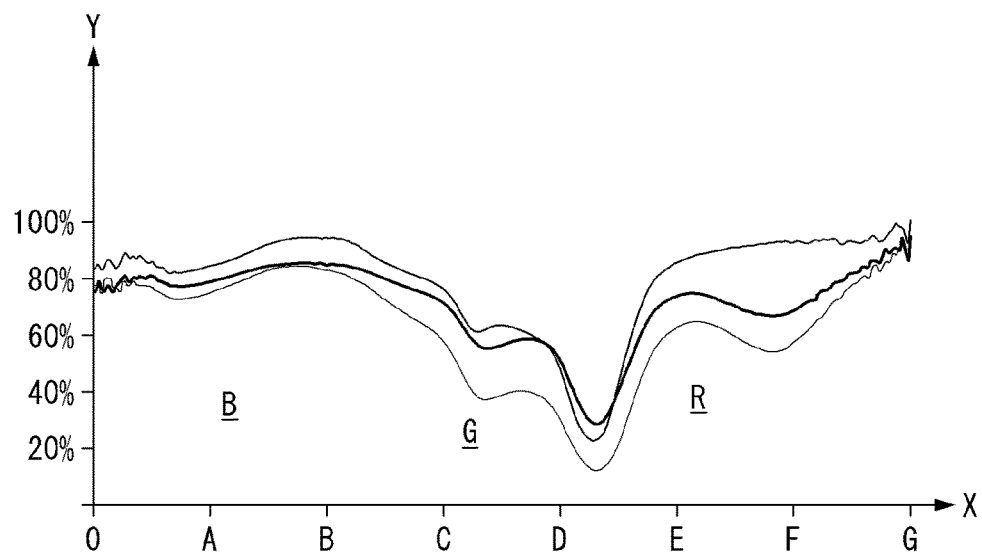
FIGS. 31 and 32 illustrate other examples of a wavelength of light according to an example embodiment of the invention.
Figure 32:
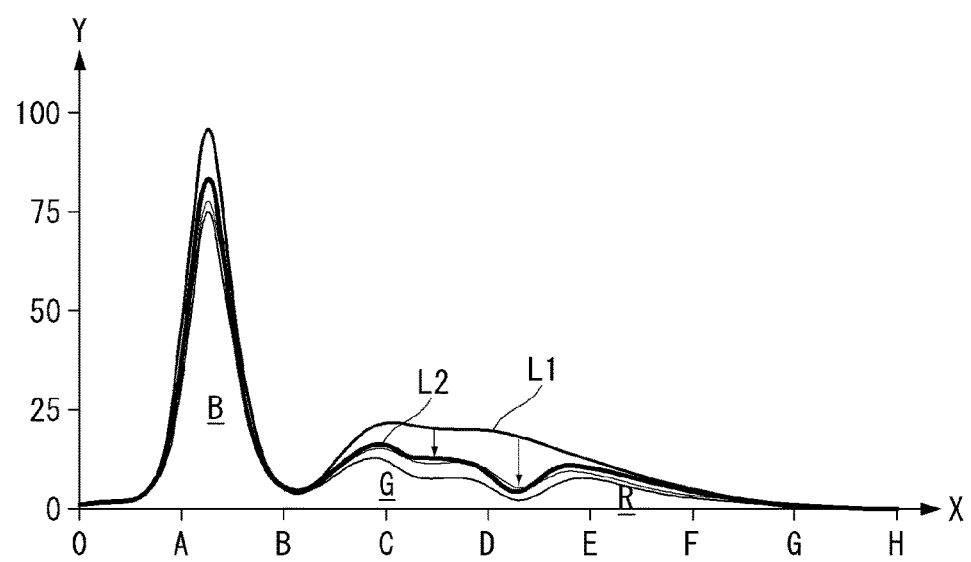

FIGS. 31 and 32 illustrate examples of a wavelength of light according to an example embodiment of the invention.

In FIGS. 31 and 32, X-axis denotes a wavelength of light, and Y-axis denotes an intensity of light. For example, in the X-axis, O may be 380 nm; A may be 430 nm; B may be 480 nm; C may be 530 nm; D may be 580 nm; E may be 630 nm; F may be 680 nm; G may be 730 nm, and H may be 780 nm. Further, in the Y-axis, "B" may be an intensity or a distribution of blue-based light; "G" may be an intensity or a distribution of green-based light; and "R" may be an intensity or a distribution of red-based light.

FIG. 31 illustrates a wavelength range of light absorbed by a light absorbing pattern. The light absorbing pattern may absorb light of a wavelength range between the wavelengths C and E. More specifically, the light absorbing pattern may absorb more light of a wavelength range between the wavelengths D and E. Namely, the light absorbing pattern may absorb light of a wavelength range between the green-based light and the red-based light.

FIG. 32 illustrates a wavelength range of light L1 provided by the light assembly 124 and a wavelength range of light L2 provided for the display panel 110 through the light guide plate 128. An intensity of the light L2 with respect to the wavelength range of the light L2 was reduced by about 10% at a wavelength range between the wavelengths C and E, compared to the light L1. More specifically, an intensity of the light L2 with respect to the wavelength range of the light L2 was reduced by about 20% at a wavelength range between the wavelengths D and E, compared to the light L1. Namely, the green-based light and the red-based light may be separated. Hence, the color reproduction may be improved.

Figure 33:
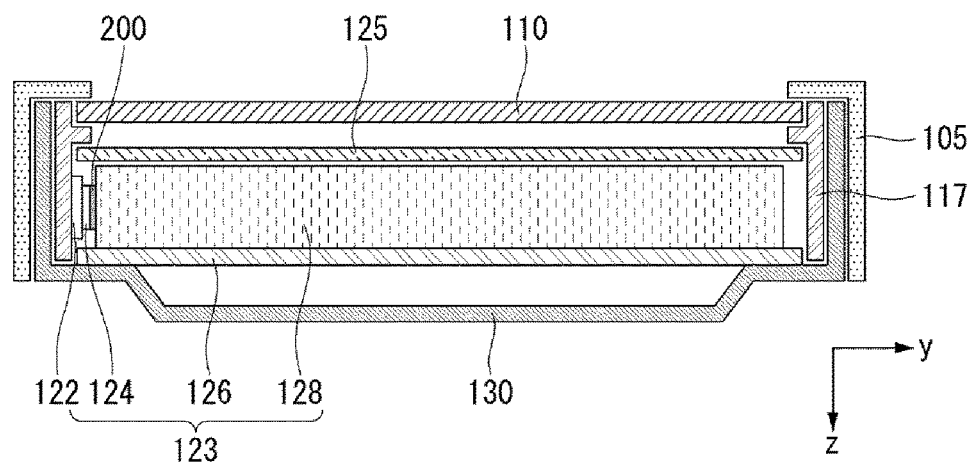
FIGS. 33 to 35 illustrate examples of a display device according to an example embodiment of the invention.
Figure 34:
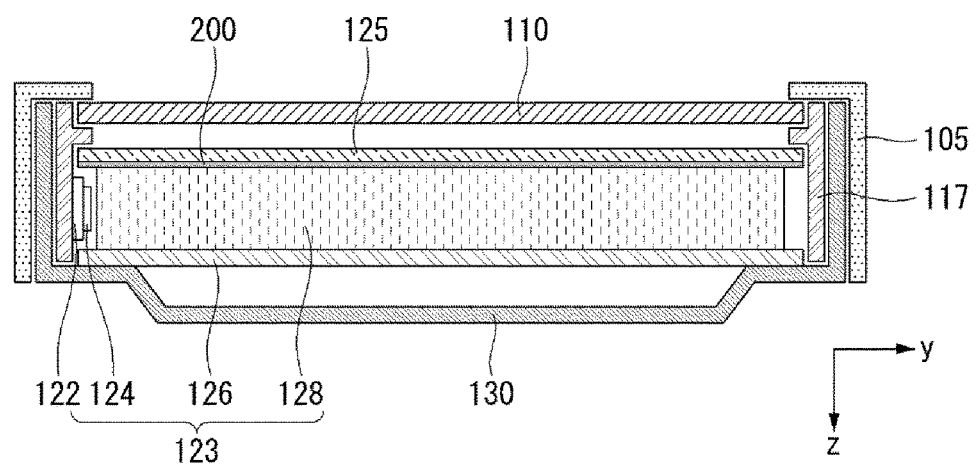
Figure 35:
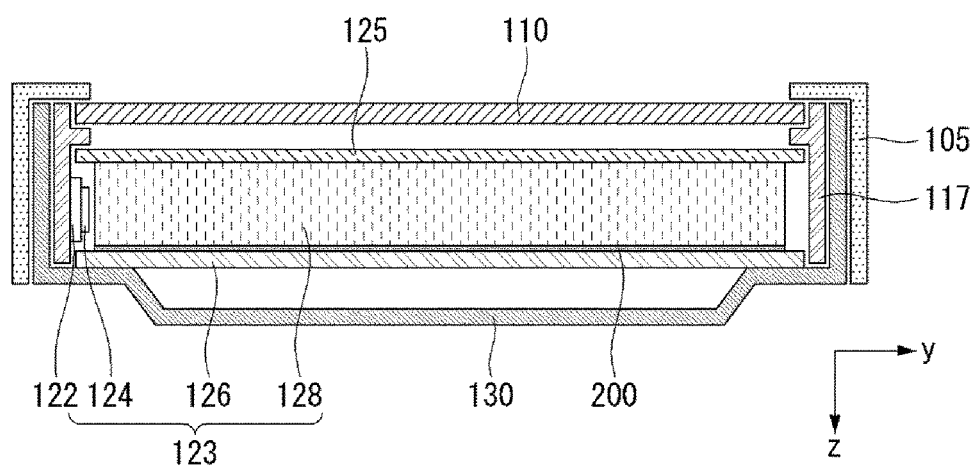

FIGS. 33 to 35 illustrate examples of the display device according to an example embodiment of the invention.

In the following description, when various examples of the light absorbing pattern including the above-described light absorbing material are described, the light absorbing pattern is commonly referred to as a light absorbing portion 200 for the sake of brevity and ease of reading.

Referring to FIG. 33, a light absorbing portion 200 may be positioned between a light assembly 124 and a light guide plate 128. The light absorbing portion 200 may be positioned on a path of light which is provided for the light guide plate 128 by the light assembly 124. The light absorbing portion 200 may be attached to the light assembly 124. The light absorbing portion 200 may directly absorb a portion having a predetermined wavelength range among light provided by the light assembly 124 on a path of the light.

In this instance, the light assembly 124 may generate heat in a process for generating light. Because the light assembly 124 provides light for a long time, heat may be generated in the light assembly 124. When the light absorbing portion 200 is attached to the light assembly 124, the light absorbing portion 200 may be affected by heat generated in the light assembly 124. The heat may generate changes in light absorption characteristic of the light absorbing portion 200. Further, the heat may weaken durability of the light absorbing portion 200.

Referring to FIG. 34, a light absorbing portion 200 may be positioned between an optical sheet 125 and a light guide plate 128. The light absorbing portion 200 may be positioned on a path of light which is provided for the display panel 110 from the light guide plate 128. For example, the light absorbing portion 200 may be configured as a sheet. When the light absorbing portion 200 configured as the sheet is positioned between the optical sheet 125 and the light guide plate 128, an influence of heat generated in the light assembly 124 may be reduced. In this instance, because the light absorbing portion 200 is configured as the sheet, a wrinkle may be generated in the light absorbing portion 200. The wrinkle may change light absorption characteristic of the light absorbing portion 200 or change characteristics (for example, refraction) of light, which is provided for the display panel 110 from the light guide plate 128. However, when the light absorbing portion 200 is configured as the sheet, the color reproduction or the color characteristics cannot be locally controlled.

Referring to FIG. 35, a light absorbing portion 200 may be positioned on a lower surface of a light guide plate 128. The light absorbing portion 200 may be formed on the lower surface of the light guide plate 128. The light absorbing portion 200 may be formed on an external surface of a lower part of the light guide plate 128. Hence, durability of the light absorbing portion 200 may be improved.

The light absorbing portion 200 may be positioned between the light guide plate 128 and a reflective sheet 126. The light absorbing portion 200 may be positioned adjacent to the reflective sheet 126 or may contact the reflective sheet 126. The light absorbing portion 200 may be formed on the lower surface of the light guide plate 128. Hence, the durability of the light absorbing portion 200 may be improved, and also a reflection generated in the lower surface of the light guide plate 128 may be improved more efficiently.

FIGS. 36 to 40 illustrate examples of a formation of a light absorbing portion and light characteristics according to an example embodiment of the invention.

Figure 36:
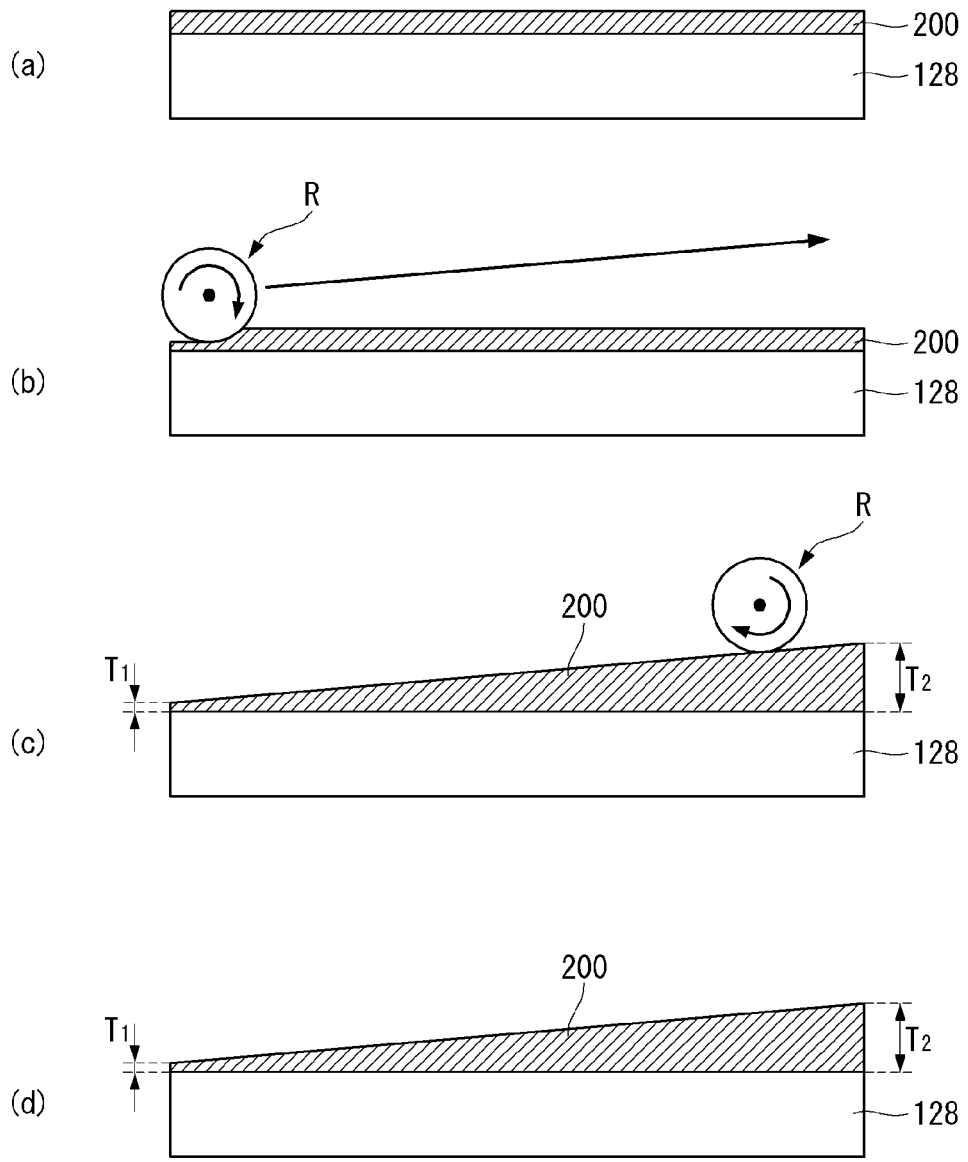
FIGS. 36 to 40 illustrate examples of a formation of a light absorbing portion and light characteristics according to an example embodiment of the invention.

Referring to (a) of FIG. 36, an ink 200 may be applied to one surface of a light guide plate 128. The ink 200 may include a light absorbing material. The ink 200 may include particles capable of scattering light. The ink 200 may simultaneously include particles capable of scattering light and a light absorbing material. The light guide plate 128 may have a smooth upper surface. This may mean that a groove, a protrusion, a pattern, etc. reflecting and/or scattering light are not formed on the upper surface of the light guide plate 128. For example, the light guide plate 128 may be formed of glass.

The light absorbing material may selectively absorb light. Namely, the ink 200 may selectively absorb light. Further, the ink 200 may scatter light. Thus, a light absorbing portion, a light absorbing layer, a light absorbing pattern, a light absorbing pad, or a light absorbing dot, which will be described later, may include the above-described light absorbing material.

Referring to (b) of FIG. 36, a roller R may move on the ink 200 applied to one surface of the light guide plate 128. The roller R may move on the ink 200 coated on the upper surface of the light guide plate 128. A distance T1 between the roller R and the light guide plate 128 at an initial position of the roller R may be different from a distance T2 between the roller R and the light guide plate 128 at a final position of the roller R. Namely, the roller R may move on the ink 200 applied or coated on the upper surface of the light guide plate 128 while changing a height. The roller R may move while pressing the ink 200, so that a thickness of the ink 200 applied or coated on the upper surface of the light guide plate 128 gradually increases or gradually decreases. In this instance, the roller R may apply heat to the ink 200. The ink 200, to which heat is applied, may be hardened.

Referring to (c) of FIG. 36, the rolling thickness T1 of the ink 200 on one side of the light guide plate 128 may be different from the rolling thickness T2 of the ink 200 on the other side of the light guide plate 128. Namely, the light guide plate 128 may be inclined by the ink 200. For example, the thickness T1 of the ink 200 at an initial position of the roller R may be less than the thickness T2 of the ink 200 at a final position of the roller R after the roller R moves.

Referring to (d) of FIG. 36, after the rolling of the roller R is completed, the ink 200 may be hardened. The ink 200 may be hardened by heat or light. A light absorbing portion 200 may be formed on one surface of the light guide plate 128 by hardening the ink 200. The light absorbing portion 200 may be formed on the upper surface of the light guide plate 128. The light absorbing portion 200 may be inclined. The light absorbing portion 200 may have different thicknesses on the upper surface of the light guide plate 128. A thickness T1 of the light absorbing portion 200 on one side may be relatively thin, and a thickness T2 of the light absorbing portion 200 on the other side may be relatively thick.

Figure 37:
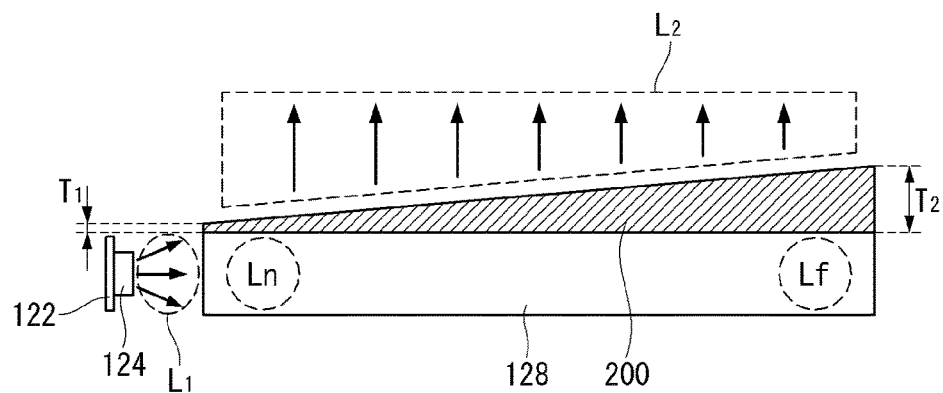

Referring to FIG. 37, light L1 emitted from the light assembly 124 may travel toward a light guide plate 128. In this instance, the light L1 provided by the light assembly 124 may have the distribution of light described in FIG. 11. Namely, when the light L1 provided by the light assembly 124 is incident on the display panel 110 through the light guide plate 128, color reproduction of an image displayed on the display panel 110 may be insufficient in representing a natural color.

The light L1 provided by the light assembly 124 may be totally reflected and/or reflected from the light guide plate 128. In this instance, light L2 upwardly emitted from the light guide plate 128 may pass through a light absorbing portion 200. The light absorbing portion 200 may absorb a portion having a predetermined wavelength range among the light L1. The light L2, which passes through the light absorbing portion 200 and is provided for the display panel 110, may be light having the predetermined wavelength range absorbed by the light absorbing portion 200.

Namely, light L2, which is provided for the display panel 110 through the light guide plate 128, may improve the color reproduction of an image displayed on the display panel 110.

The light absorbing portion 200 may have different thicknesses. The light absorbing portion 200 may have the non-uniform thickness on an upper surface of the light guide plate 128. For example, a thickness T1 of the light absorbing portion 200 adjacent to the light assembly 124 may be less than a thickness T2 of the light absorbing portion 200 far away from the light assembly 124.

Light Ln emitted from the light guide plate 128 adjacent to the light assembly 124 may have the characteristic or the distribution different from light Lf emitted from the light guide plate 128 far away from the light assembly 124. The thickness of the light absorbing portion 200 may be adjusted depending on the light characteristic difference or the light distribution difference. The thickness of the light absorbing portion 200 may vary depending on the shape, the size, the width, etc. of the light guide plate 128. The thickness of the light absorbing portion 200 may vary depending on the position, the disposition, etc. of the light assembly 124 and the light guide plate 128. For example, the thickness T1 of the light absorbing portion 200 may be ⅓ to ½ of the thickness T2 of the light absorbing portion 200.

The light absorbing portion 200 having the different thicknesses may change the characteristic or the distribution of light L2 emitted from the light guide plate 128 into characteristic or distribution of light capable of representing a natural color. Namely, the light L2 provided for the display panel 110 may be light which is adjusted by the light absorbing portion 200 and has the improved color reproduction.

Figure 38:
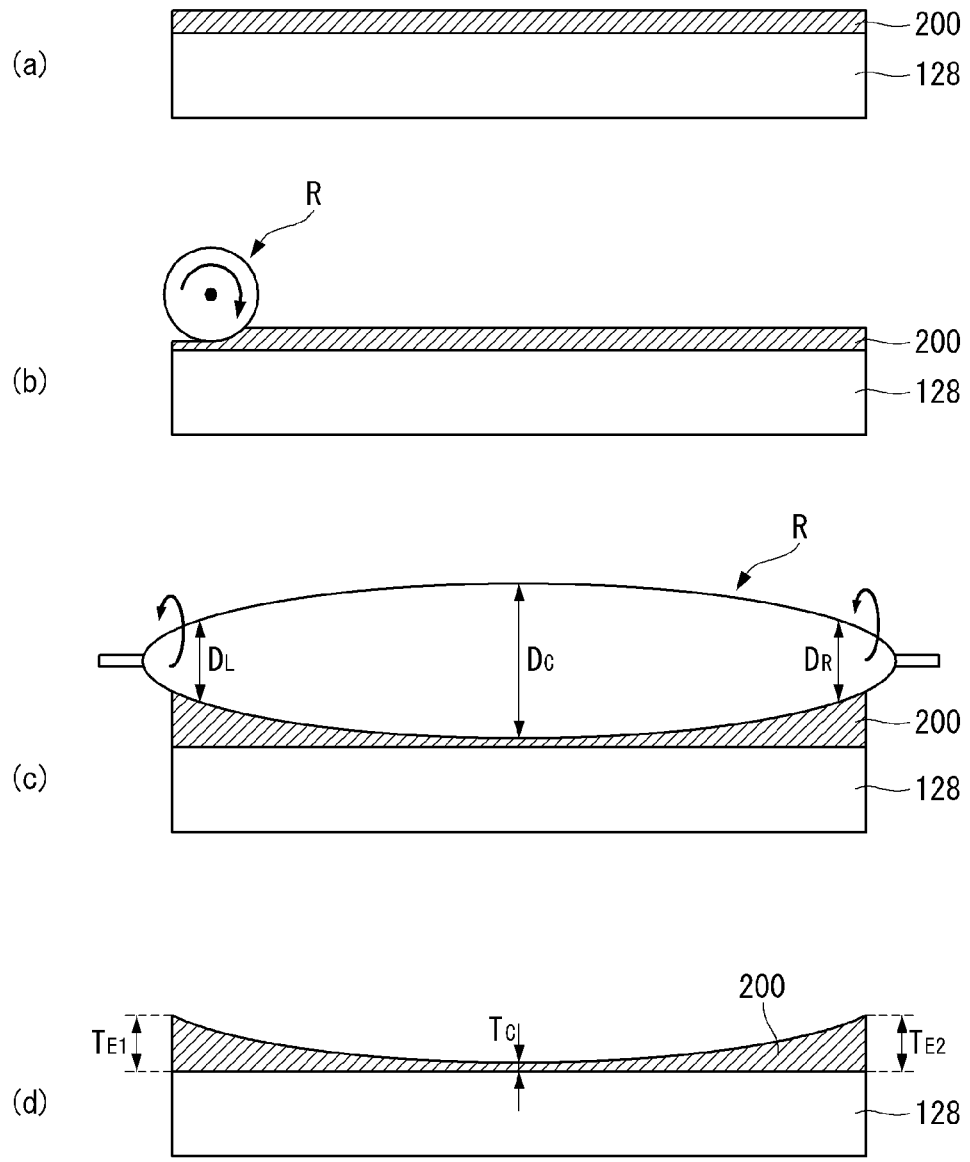

Referring to (a) of FIG. 38, an ink 200 may be applied to one surface of a light guide plate 128. The ink 200 may be applied to an upper surface of the light guide plate 128. The ink 200 may include a light absorbing material. The ink 200 may include particles capable of scattering light. The ink 200 may simultaneously include particles capable of scattering light and a light absorbing material.

The light absorbing material may selectively absorb light. Namely, the ink 200 may selectively absorb light. Further, the ink 200 may scatter light. The ink 200 may be hardened to form a light absorbing portion, a light absorbing layer, a light absorbing pattern, a light absorbing pad, or a light absorbing dot. They may include the above-described light absorbing material.

Referring to (b) of FIG. 38, a roller R may move on the ink 200 applied to one surface of the light guide plate 128.

The roller R may move on the ink 200 coated on the upper surface of the light guide plate 128.

The roller R may move on the ink 200 applied or coated on the upper surface of the light guide plate 128 while changing a height. The roller R may move while pressing the ink 200, so that a thickness of the ink 200 applied or coated on the upper surface of the light guide plate 128 gradually increases or gradually decreases. In this instance, the roller R may apply heat to the ink 200. The ink 200, to which heat is applied, may be hardened.

Referring to (c) and (d) of FIG. 38, a position distance TE1 of the roller R on one side of the light guide plate 128 may be different from a position distance TE2 of the roller R on the other side of the light guide plate 128. Further, a position distance TC of the roller R in the center of the light guide plate 128 may be different from the position distance TE1 of the roller R on the left side of the light guide plate 128 or the position distance TE2 of the roller R on the right side of the light guide plate 128.

For example, a diameter DL of the roller R on the left side of the light guide plate 128 or a diameter DR of the roller R on the right side of the light guide plate 128 may be different from a diameter DC of the roller R in the center of the light guide plate 128. As another example, the diameter DL of the roller R on the left side of the light guide plate 128 may be different from the diameter DR of the roller R on the right side of the light guide plate 128.

The rolling thickness TE1 or TE2 of the ink 200 on one side of the light guide plate 128 may be different from the rolling thickness TC of the ink 200 in the center of the light guide plate 128. Namely, the light guide plate 128 may be inclined by the ink 200. For example, the rolling thickness TC of the ink 200 in the center of the light guide plate 128 may be less than the rolling thickness TE1 or TE2 of the ink 200 on the left or the right side of the light guide plate 128.

For example, the rolling thickness TC of the ink 200 in the center of the light guide plate 128 may be ⅓ to ½ of the rolling thickness TE1 of the roller R on the left side of the light guide plate 128. As another example, the rolling thickness TC of the ink 200 in the center of the light guide plate 128 may be ⅓ to ½ of the rolling thickness TE2 of the roller R on the right side of the light guide plate 128.

After the rolling of the roller R is completed, the ink 200 may be hardened. The ink 200 may be hardened by heat or light. A light absorbing portion 200 may be formed on one surface of the light guide plate 128 by hardening the ink 200. The light absorbing portion 200 may be formed on the upper surface of the light guide plate 128. The light absorbing portion 200 may be inclined. The light absorbing portion 200 may have different thicknesses on the upper surface of the light guide plate 128. The thickness TC of the light absorbing portion 200 in the center of the light guide plate 128 may be relatively thin, and the thickness TE1 or TE2 of the light absorbing portion 200 on the left or the right side of the light guide plate 128 may be relatively thick.

The light absorbing portion 200 in the center of the light guide plate 128 may have the thin thickness TC, and the light absorbing portion 200 adjacent to the edge of the light guide plate 128 may have the thick thicknesses TE1 and TE2. Hence, the color reproduction of light may be locally controlled throughout the light guide plate 128.

Figure 39:
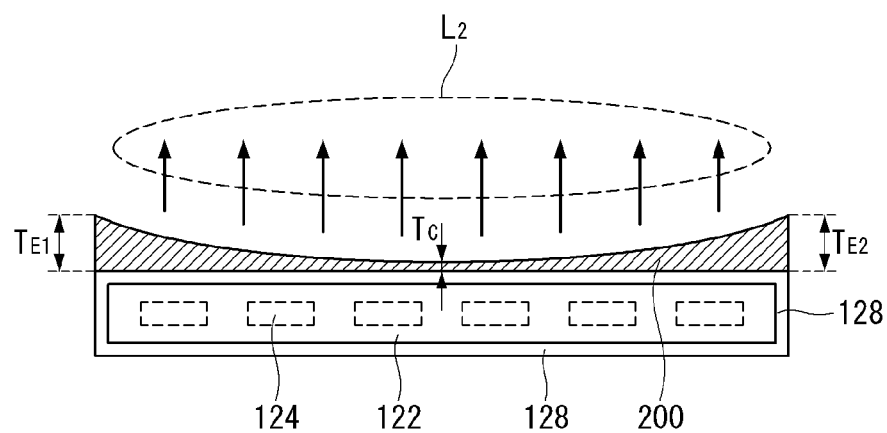
Figure 40:
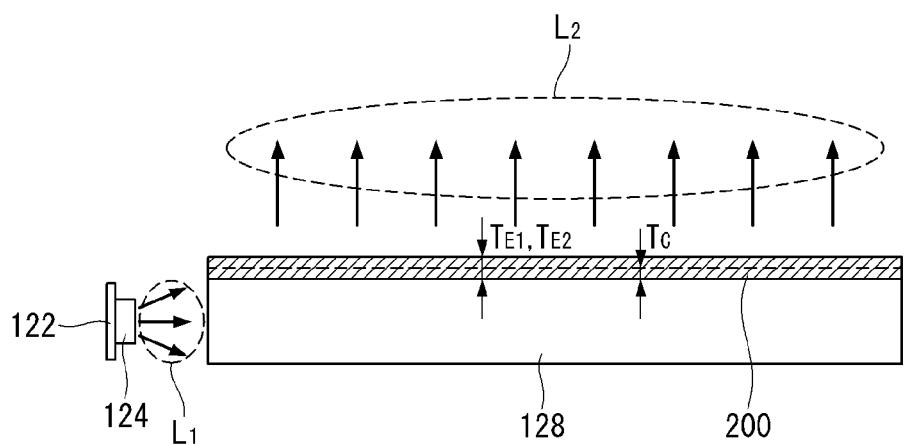

Referring to FIGS. 39 and 40, light L1 emitted from the light assembly 124 may travel toward a light guide plate 128. In this instance, the light L1 provided by the light assembly 124 may have the distribution of light described in FIG. 11. Namely, when the light L1 provided by the light assembly 124 is incident on the display panel 110 through the light guide plate 128, color reproduction of an image displayed on the display panel 110 may be insufficient in representing a natural color.

The light L1 provided by the light assembly 124 may be totally reflected and/or reflected from the light guide plate 128. In this instance, light L2 upwardly emitted from the light guide plate 128 may pass through a light absorbing portion 200. The light absorbing portion 200 may absorb a portion having a predetermined wavelength range among the light L1. The light L2, which passes through the light absorbing portion 200 and is provided for the display panel 110, may be light having the predetermined wavelength range absorbed by the light absorbing portion 200.

Namely, light L2, which is provided for the display panel 110 through the light guide plate 128, may improve the color reproduction of an image displayed on the display panel 110.

The light absorbing portion 200 may have different thicknesses. The light absorbing portion 200 may have the non-uniform thickness on an upper surface of the light guide plate 128. For example, a thickness TC of the light absorbing portion 200 in the center of the light guide plate 128 may be less than thicknesses TE1 and TE2 of the light absorbing portion 200 adjacent to an edge of the light guide plate 128.

Light characteristic or light distribution of light may vary depending on the position of the light guide plate 128. The thickness of the light absorbing portion 200 may be adjusted depending on changes in the light characteristic or the light distribution. The thickness of the light absorbing portion 200 may vary depending on the shape, the size, the width, etc. of the light guide plate 128. The thickness of the light absorbing portion 200 may vary depending on the position, the disposition, etc. of the light assembly 124 and the light guide plate 128. For example, the thickness TC of the light absorbing portion 200 may be ⅓ to ½ of the thicknesses TE1 and TE2 of the light absorbing portion 200.

The light absorbing portion 200 having the different thicknesses may change the characteristic or the distribution of light L2 emitted from the light guide plate 128 into characteristic or distribution of light capable of representing a natural color. Namely, the light L2 provided for the display panel 110 may be light which is adjusted by the light absorbing portion 200 and has the improved color reproduction.

In other words, the light absorbing portion 200 in the center of the light guide plate 128 may have the thin thickness TC, and the light absorbing portion 200 adjacent to the edge of the light guide plate 128 may have the thick thicknesses TE1 and TE2. Hence, the color reproduction of light may be locally controlled throughout the light guide plate 128.

Figure 41:
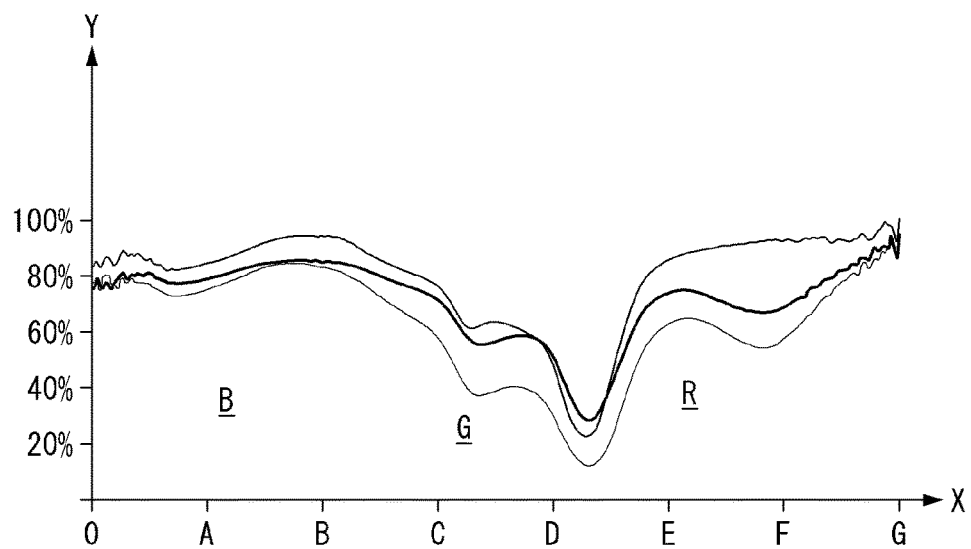
FIGS. 41 and 42 illustrate other examples of a wavelength of light according to an example embodiment of the invention.
Figure 42:
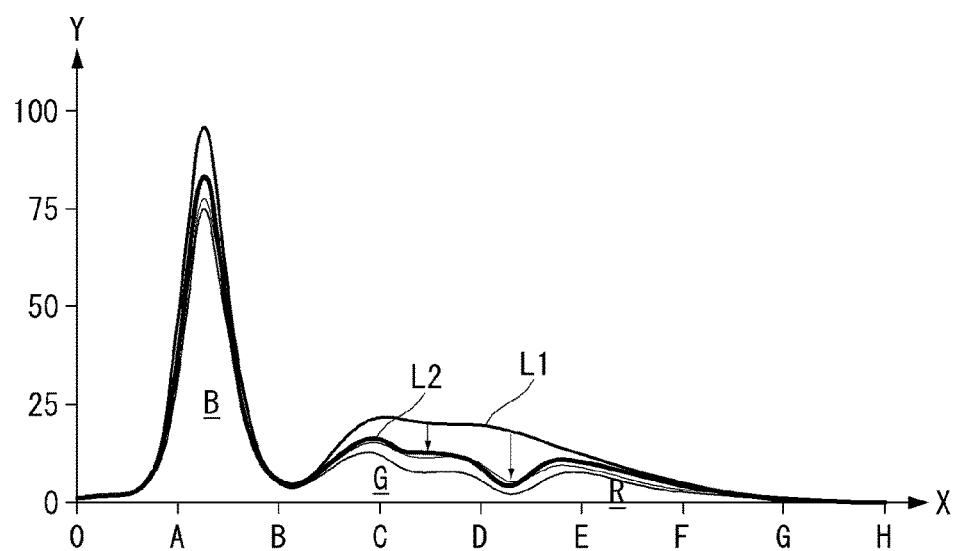

FIGS. 41 and 42 illustrate other examples of a wavelength of light according to an example embodiment of the invention.

In FIGS. 41 and 42, X-axis denotes a wavelength of light, and Y-axis denotes an intensity of light. For example, in the X-axis, O may be 380 nm; A may be 430 nm; B may be 480 nm; C may be 530 nm; D may be 580 nm; E may be 630 nm; F may be 680 nm; G may be 730 nm, and H may be 780 nm. Further, in the Y-axis, "B" may be an intensity or a distribution of blue-based light; "G" may be an intensity or a distribution of green-based light; and "R" may be an intensity or a distribution of red-based light.

FIG. 41 illustrates a wavelength range of light absorbed by the light absorbing portion 200. The light absorbing portion 200 may absorb light of a wavelength range between the wavelengths C and E. More specifically, the light absorbing portion 200 may absorb more light of a wavelength range between the wavelengths D and E. Namely, the light absorbing portion 200 may absorb light of a wavelength range between the green-based light and the red-based light.

FIG. 42 illustrates a wavelength range of light L1 provided by the light assembly 124 and a wavelength range of light L2 provided for the display panel 110 through the light guide plate 128. An intensity of the light L2 with respect to the wavelength range of the light L2 was reduced by about 10% at a wavelength range between the wavelengths C and E, compared to the light L1. More specifically, an intensity of the light L2 with respect to the wavelength range of the light L2 was reduced by about 20% at a wavelength range between the wavelengths D and E, compared to the light L1. Namely, the green-based light and the red-based light may be separated. Hence, the color reproduction may be improved.

Figure 43:
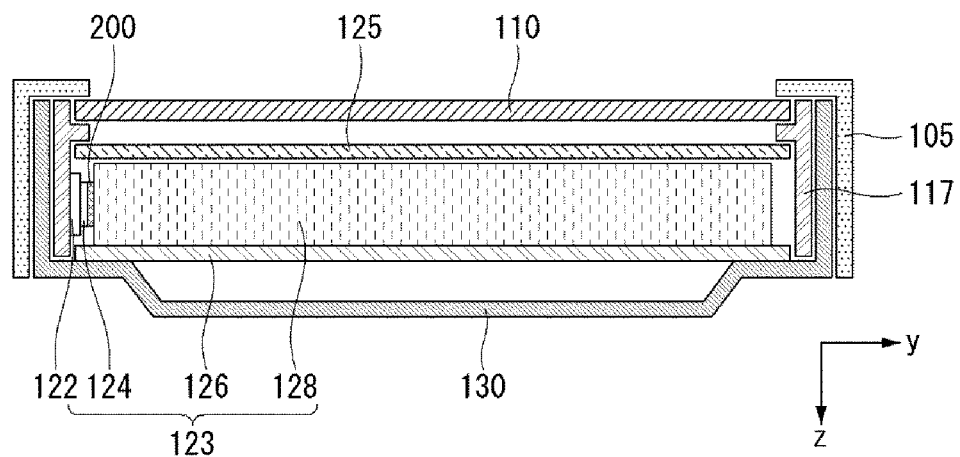
FIGS. 43 and 44 illustrate examples of a display device according to an example embodiment of the invention.
Figure 44:
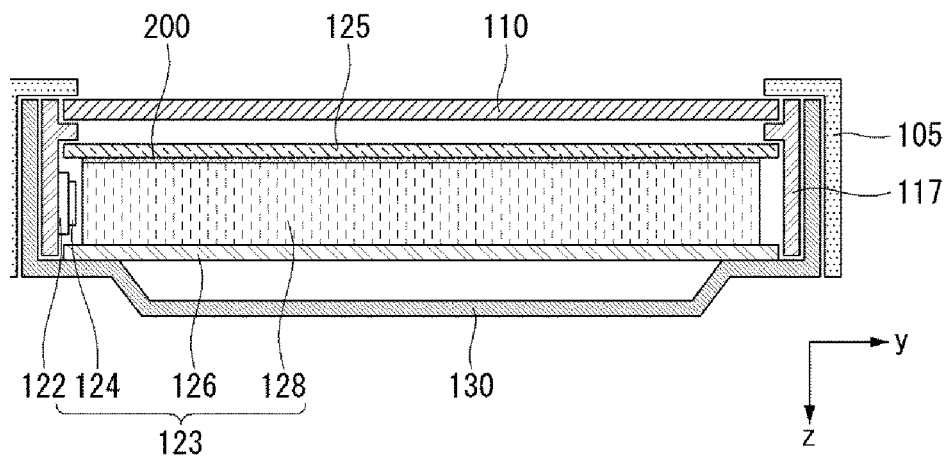

FIGS. 43 and 44 illustrate examples of a display device according to an example embodiment of the invention.

Referring to FIG. 43, a light absorbing portion 200 may be positioned between a light assembly 124 and a light guide plate 128. The light absorbing portion 200 may be positioned on a path of light which is provided for the light guide plate 128 by the light assembly 124. The light absorbing portion 200 may be attached to the light assembly 124. The light absorbing portion 200 may directly absorb a portion having a predetermined wavelength range among light provided by the light assembly 124 on a path of the light.

In this instance, the light assembly 124 may generate heat in a process for generating light. Because the light assembly 124 provides light for a long time, heat may be generated in the light assembly 124. When the light absorbing portion 200 is attached to the light assembly 124, the light absorbing portion 200 may be affected by heat generated in the light assembly 124. The heat may generate changes in light absorption characteristic of the light absorbing portion 200. Further, the heat may weaken durability of the light absorbing portion 200.

Referring to FIG. 44, a light absorbing portion 200 may be positioned under the display panel 110. The light absorbing portion 200 may be positioned between the display panel 110 and a light guide plate 128. The light absorbing portion 200 may be positioned on a path of light which is provided by the light guide plate 128 and travels toward the display panel 110. The light absorbing portion 200 may be positioned between an optical sheet 125 and the light guide plate 128. The light absorbing portion 200 may be positioned on a path of light which is provided for the display panel 110 through the light guide plate 128.

When the light absorbing portion 200 is positioned between the display panel 110 and the light guide plate 128, an influence of heat generated in the light assembly 124 may be reduced. When the light absorbing portion 200 is positioned under the display panel 110, characteristics of light provided for the display panel 110 may be efficiently controlled, and color reproduction of an image displayed on the display panel 110 may be improved. Namely, changes in the characteristics of light by other components may be reduced.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a display panel;
    a light guide plate located at a rear of the display panel;
    a light assembly located at a side of the light guide plate and configured to provide the light guide plate with light;
    a light absorbing portion formed on a back surface of the light guide plate and configured to absorb the light provided by the light assembly in a predetermined wavelength range; and
    a reflective portion formed on the back surface of the light guide plate and configured to reflect the light provided by the light assembly on the display panel,
    wherein the light absorbing portion is formed around the reflective portion.

2. The display device of claim 1, wherein at least one of the light absorbing portion or the reflective portion forms a pattern, and
    wherein the pattern is uniformly distributed or uniformly sized.

3. The display device of claim 1, wherein at least one of the light absorbing portion or the reflective portion forms a pattern, and
    wherein the pattern is non-uniformly distributed or non-uniformly sized.

4. The display device of claim 1,
    wherein the light absorbing portion and the reflective portion are formed as one body.

5. The display device of claim 1, wherein the reflective portion comprises a groove formed on the back surface of the light guide plate, and
    wherein the light absorbing portion is positioned in the groove.

6. The display device of claim 1, wherein the reflective portion comprises a groove formed on the back surface of the light guide plate, and
    wherein the light absorbing portion is positioned around the groove.

7. The display device of claim 1, wherein the light absorbing portion includes tetraaza porphyrin derivatives.

8. The display device of claim 1, wherein the light absorbing portion includes sub-phthalocyanine pigment.

9. The display device of claim 1, wherein the predetermined wavelength range is a wavelength range of 530 nm to 630 nm.

10. The display device of claim 1, wherein the predetermined wavelength range is between a wavelength of green light and a wavelength of red light.

11. The display device of claim 1, wherein the light absorbing portion is attached to the back surface of the light guide plate.

12. The display device of claim 1, wherein the light absorbing portion includes a reflective material.

13. The display device of claim 12, wherein
    a density of a pattern of the light absorbing portion increases as it approaches the light assembly.

14. The display device of claim 1, further comprising an ink layer at the back surface of the light guide plate,
 wherein the ink layer comprises the reflective portion and the light absorbing portion.

15. The display device of claim 14, wherein a thickness of the ink layer decreases as it approaches the light assembly.

* * * * *